(12) United States Patent
Watanabe et al.

(10) Patent No.: US 10,616,449 B2
(45) Date of Patent: Apr. 7, 2020

(54) IMAGE PROCESSING APPARATUS AND INFORMATION PROCESSING APPARATUS

(71) Applicant: FUJI XEROX CO., LTD., Tokyo (JP)

(72) Inventors: Ayako Watanabe, Kanagawa (JP);
Masahiko Kubo, Kanagawa (JP);
Yosuke Tashiro, Kanagawa (JP);
Kaoru Yamauchi, Kanagawa (JP);
Kaori Iwaki, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 15/914,382

(22) Filed: Mar. 7, 2018

(65) Prior Publication Data

US 2019/0082079 A1   Mar. 14, 2019

(30) Foreign Application Priority Data

Sep. 8, 2017   (JP) .................................. 2017-173235

(51) Int. Cl.
| | | |
|---|---|---|
| H04N 1/60 | (2006.01) | |
| H04N 1/00 | (2006.01) | |
| G06F 3/12 | (2006.01) | |
| H04N 1/401 | (2006.01) | |

(52) U.S. Cl.
CPC ......... *H04N 1/6086* (2013.01); *G06F 3/1208* (2013.01); *G06F 3/1247* (2013.01); *G06F 3/1256* (2013.01); *G06F 3/1282* (2013.01); *H04N 1/00023* (2013.01); *H04N 1/00034* (2013.01); *H04N 1/401* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0122589 | A1* | 9/2002 | Reiman ................. | G06T 11/001 382/167 |
| 2012/0320393 | A1* | 12/2012 | Ito ........................... | H04N 1/54 358/1.9 |
| 2015/0110398 | A1* | 4/2015 | Totsuka ................. | G06T 11/001 382/167 |
| 2018/0249044 | A1* | 8/2018 | Ikari .................... | H04N 1/6094 |
| 2019/0037085 | A1* | 1/2019 | Inaba ................. | H04N 1/00267 |

FOREIGN PATENT DOCUMENTS

| | | |
|---|---|---|
| JP | 5915302 A | 5/2016 |
| JP | 5920580 A | 5/2016 |

* cited by examiner

*Primary Examiner* — Helen Zong
(74) *Attorney, Agent, or Firm* — Sughrue Mion, PLLC

(57) ABSTRACT

An image processing apparatus includes a first converter and a second converter. The first converter converts coloring-material amounts of plural coloring materials including a luster coloring material to plural colorimetric values obtained in a case of performing, in plural color measurement directions, a color measurement of a target color image printed using the plural coloring materials. The second converter converts the plural colorimetric values obtained as a result of conversion by the first converter to display values for displaying the target color image on a display device.

16 Claims, 21 Drawing Sheets

FIG. 11

WEIGHTED AVERAGE $\Delta E(WAVG)$ OF COLOR DIFFERENCES
= {w1×(COLOR DIFFERENCE BETWEEN L*a*b*(15°) AND f(R, G, B, 15°))
+w2×(COLOR DIFFERENCE BETWEEN L*a*b*(45°) AND f(R, G, B, 45°))
+w3×(COLOR DIFFERENCE BETWEEN L*a*b*(110°) AND f(R, G, B, 110°))}/(w1+w2+w3)

w1: WEIGHTED COEFFICIENT IN REGULAR REFLECTION DIRECTION (15°)
w2: WEIGHTED COEFFICIENT IN FRONT DIRECTION (45°)
w3: WEIGHTED COEFFICIENT IN DIFFUSED-LIGHT DIRECTION (110°)

CALCULATE R, G, AND B VALUES FOR WHICH WEIGHTED AVERAGE $\Delta E(WAVG)$ OF COLOR DIFFERENCES IS MINIMIZED.

HERE, f(R, G, B, 15°)=f(R, G, B, 45°)=f(R, G, B, 110°) MAY BE ASSUMED.

FIG. 13

| L*(15°) | w1 (COLOR MEASUREMENT DIRECTION: 15°) | w2 (COLOR MEASUREMENT DIRECTION: 45°) | w3 (COLOR MEASUREMENT DIRECTION: 110°) |
|---|---|---|---|
| 0 TO 100 | 1.0 | 1.0 | 1.0 |
| 110 | 1.0 | 1.0 | 0.75 |
| 120 | 1.0 | 1.0 | 0.5 |
| 130 | 1.0 | 1.0 | 0.25 |
| 140 OR MORE | 1.0 | 1.0 | 0 |

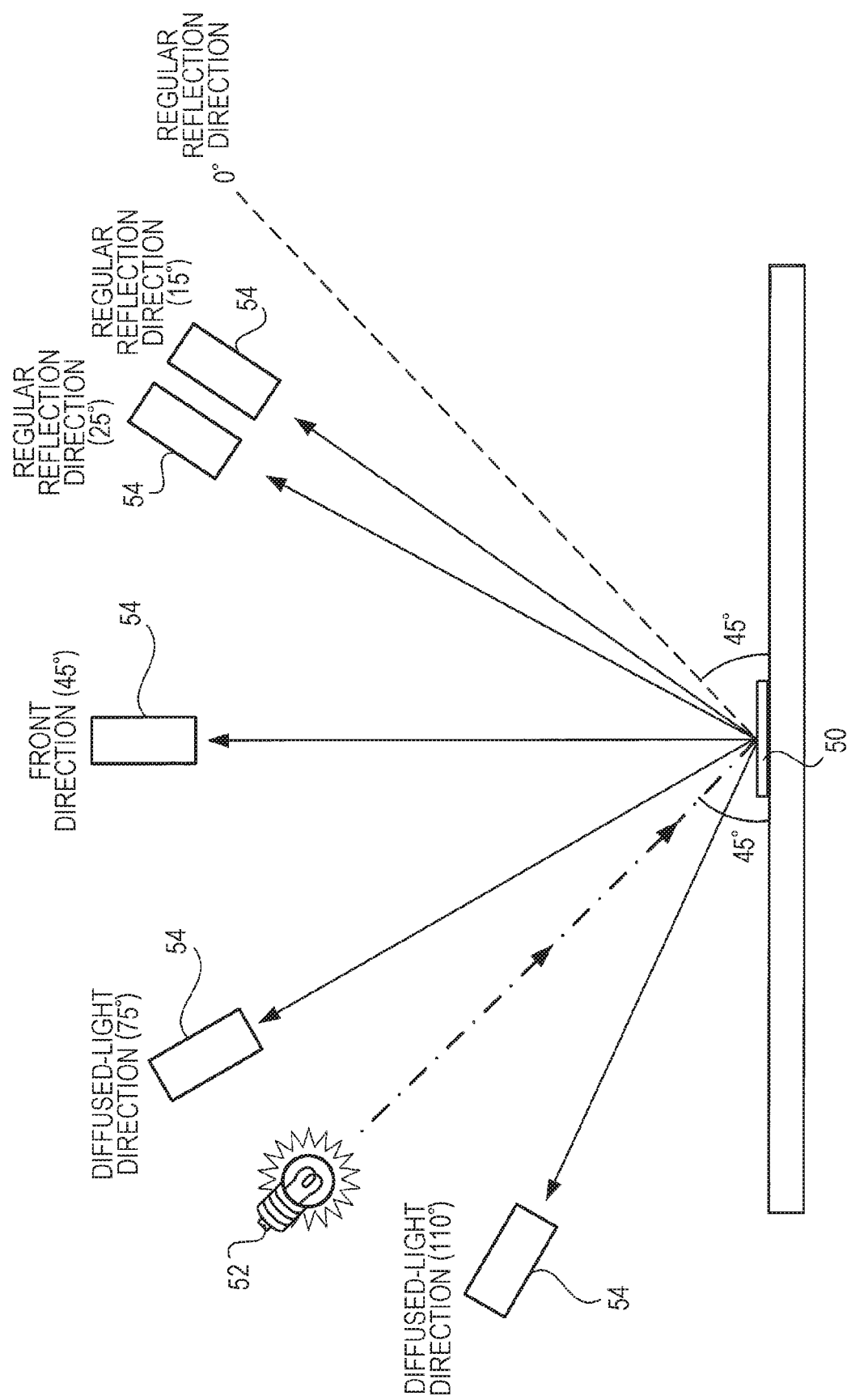

IMAGE PROCESSING APPARATUS AND INFORMATION PROCESSING APPARATUS

CROSS-REFERENCE TO RELATED APPLICATIONS

This application is based on and claims priority under 35 USC 119 from Japanese Patent Application No. 2017-173235 filed Sep. 8, 2017.

BACKGROUND

Technical Field

The present invention relates to an image processing apparatus and an information processing apparatus.

Summary

According to an aspect of the invention, there is provided an image processing apparatus including a first converter and a second converter. The first converter converts coloring-material amounts of plural coloring materials including a luster coloring material to plural colorimetric values obtained in a case of performing, in plural color measurement directions, a color measurement of a target color image printed using the plural coloring materials. The second converter converts the plural colorimetric values obtained as a result of conversion by the first converter to display values for displaying the target color image on a display device.

BRIEF DESCRIPTION OF THE DRAWINGS

Exemplary embodiments of the present invention will be described in detail based on the following figures, wherein:

FIG. 11 is a diagram for describing a specific example method for calculating the weighted average $\Delta E(WAVG)$ of color differences;

FIG. 13 is a table illustrating the example settings of the weighted coefficients w1, w2, and w3 illustrated in FIG. 12;

FIG. 21 is a diagram for describing a case where a color measurement of a measurement target image is performed in color measurement directions at five angles.

DETAILED DESCRIPTION

Hereinafter, exemplary embodiments of the present invention will be described in detail with reference to the drawings.

First Exemplary Embodiment

Figure 1:
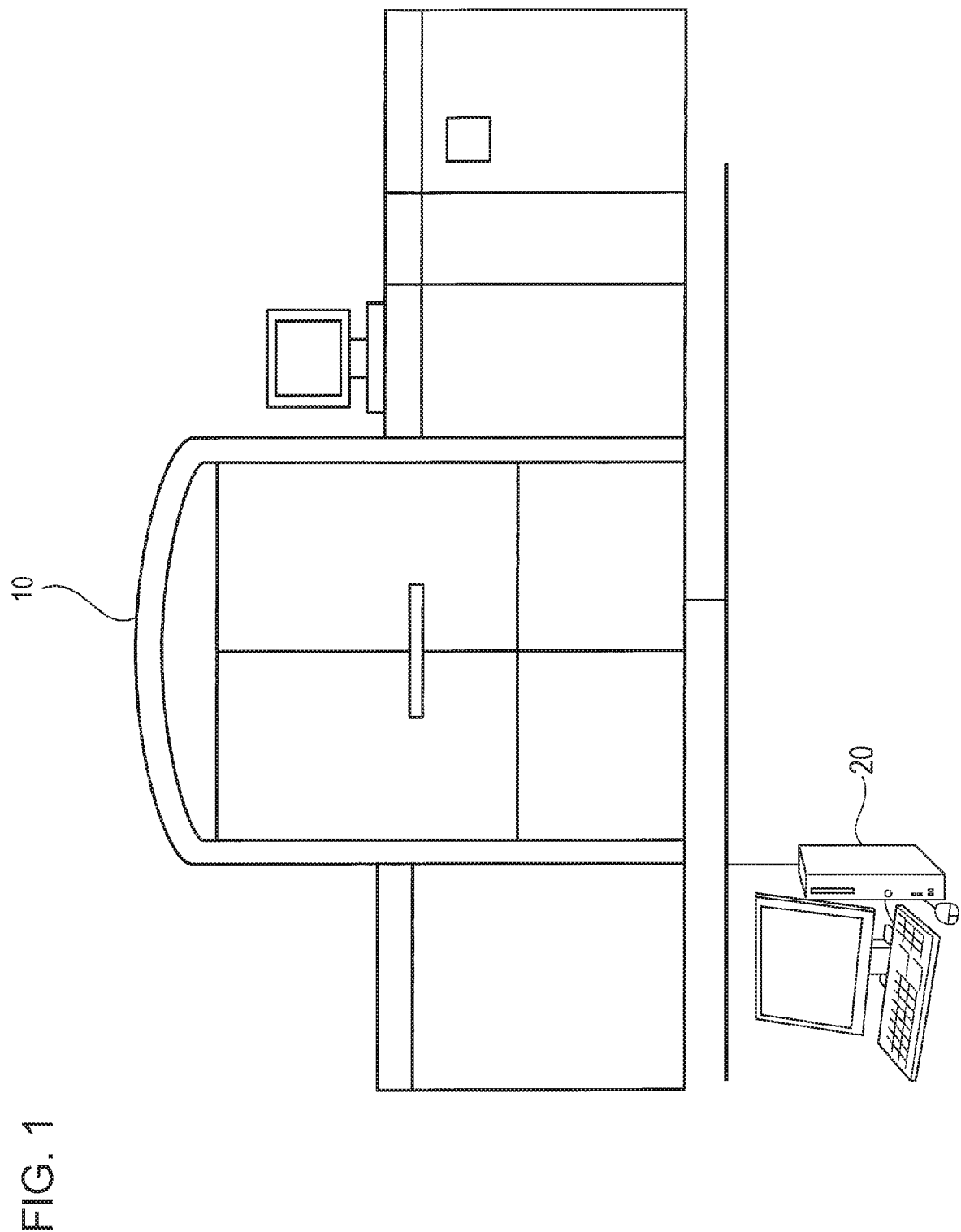
FIG. 1 is a diagram illustrating a system configuration of a print system according to a first exemplary embodiment of the present invention.

FIG. 1 is a diagram illustrating a configuration of a print system according to a first exemplary embodiment of the present invention.

The print system according to this exemplary embodiment includes an image forming apparatus 10 and a terminal apparatus 20, which is an information processing apparatus, connected to each other via a network, as illustrated in FIG. 1.

The image forming apparatus 10 according to this exemplary embodiment is, as illustrated in FIG. 1, a production printer that is used in commercial printing, and has functions that enable high-speed print processing with high image quality.

Figure 2:
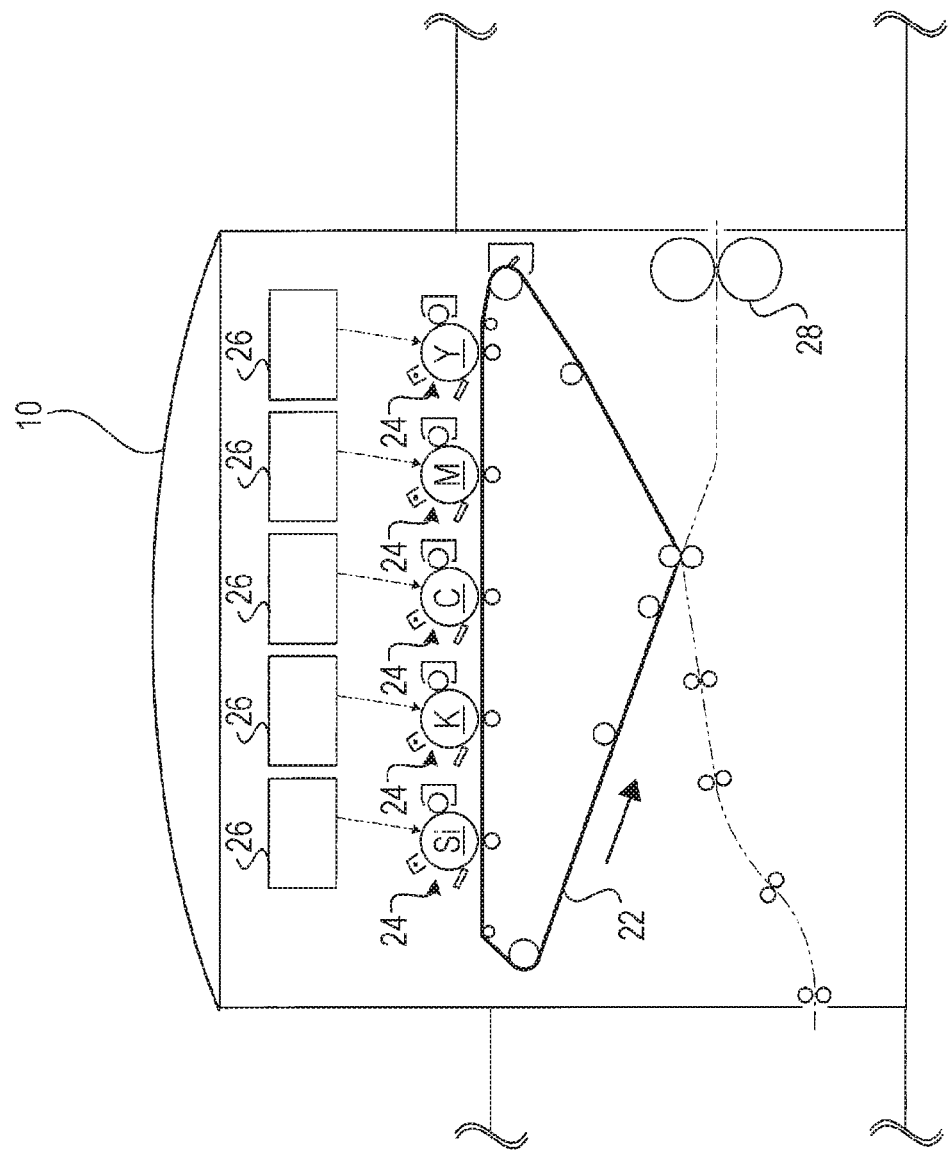
FIG. 2 is a diagram for describing a structure inside a system unit of an image forming apparatus.

The structure inside the system unit of the image forming apparatus 10 is described with reference to FIG. 2. As illustrated in FIG. 2, the image forming apparatus 10 includes five image forming units 24. The five image forming units 24 are configured to form images using toners of yellow (Y), magenta (M), cyan (C), black (K), and a special color, respectively.

As a toner of the special color, a silver toner (Si), a gold toner (G), a clear toner, a white toner, and so on are available. It is allowed to select and use one toner from among these special-color toners. FIG. 2 illustrates a case where a silver toner (Si) is selected and set from among the special-color toners.

Note that, in this exemplary embodiment, a case is described where an image is formed by using a luster (glossy) metallic (metallic gloss color) toner, such as a silver toner or a gold toner, and where the amounts of toners (amounts of coloring materials) of respective colors including a metallic toner are determined. In the description given below, a case where a silver toner is used to form an image is described.

Here, the amount of toner is the amount of toner used per unit area of a recording medium, such as the weight of toner ($g/m^2$). In the description given below, the amount of toner is represented by a percent value (toner coverage) that is the ratio of the amount of toner of each color used in printing relative to the maximum amount of toner of the color used per unit area, such as per pixel, where the maximum amount is assumed to be equal to 100%.

The image forming units 24 each include a photoconductor drum, a charging device that uniformly charges the surface of the photoconductor drum, a developing device that develops an electrostatic latent image formed on the photoconductor drum, and so on. On the photoconductor drums of the image forming units 24, electrostatic latent images are formed by light scanning devices 26 emitting laser beams. The electrostatic latent images are developed by using toners of respective colors, and images are formed.

The images of respective colors formed by the image forming units 24 are transferred to an intermediate transfer belt 22, and thereafter, further transferred to a conveyed print sheet. The toner image transferred to the print sheet is fixed on the print sheet by a fuser 28 applying heat and pressure.

When an image is thus formed by using C, M, Y, and K toners and a luster Si toner, an image for which the color tone, brightness, and so on change depending on the viewing direction is formed.

There is a case where a user wants to check the color tone of an image to be formed before the image is formed using C, M, Y, K, and Si toners. For example, there is a case where a user wants to simulate and display, on a monitor of an information processing apparatus, such as the terminal apparatus 20, an image to be formed using C, M, Y, K, and Si toners.

However, in a display device, such as a monitor, the color of each pixel is determined on the basis of display values, such as R, G, and B values, and the color tone, brightness, and so on hardly change regardless of the viewing direction.

Accordingly, in a case of printing an image displayed on a display device, such as a monitor, by the image forming apparatus 10 using C, M, Y, K, and Si toners, the printed image and the image displayed on the display device may be significantly different from each other in visual impressions.

Specifically, in a case where R, G, and B values for displaying an image on a display device are generated by performing conversion on the basis of a colorimetric value obtained in a case of performing a color measurement of a luster image in a single direction, it is possible to make the color tone and brightness of the image displayed on the display device closer to the color tone and brightness observed in the single direction; however, it is not possible to reproduce the color tone or brightness observed in other directions.

Specifically, a luster image has a high luminance level when viewed in a regular reflection direction. Therefore, in a case of reproducing, on a display device, the color tone and brightness of such a luster image observed in a single direction, the luster image has the impression that the image is darker than the actual image.

Accordingly, in a case of converting C, M, Y, K, and Si values used by the image forming apparatus 10 for printing to R, G, and B values for display on a display device, such as a monitor, the terminal apparatus 20 according to this exemplary embodiment performs processing so as to improve color reproduction of the image to be displayed by making the impression of the image to be displayed closer to that of the image that is actually printed.

Figure 3:
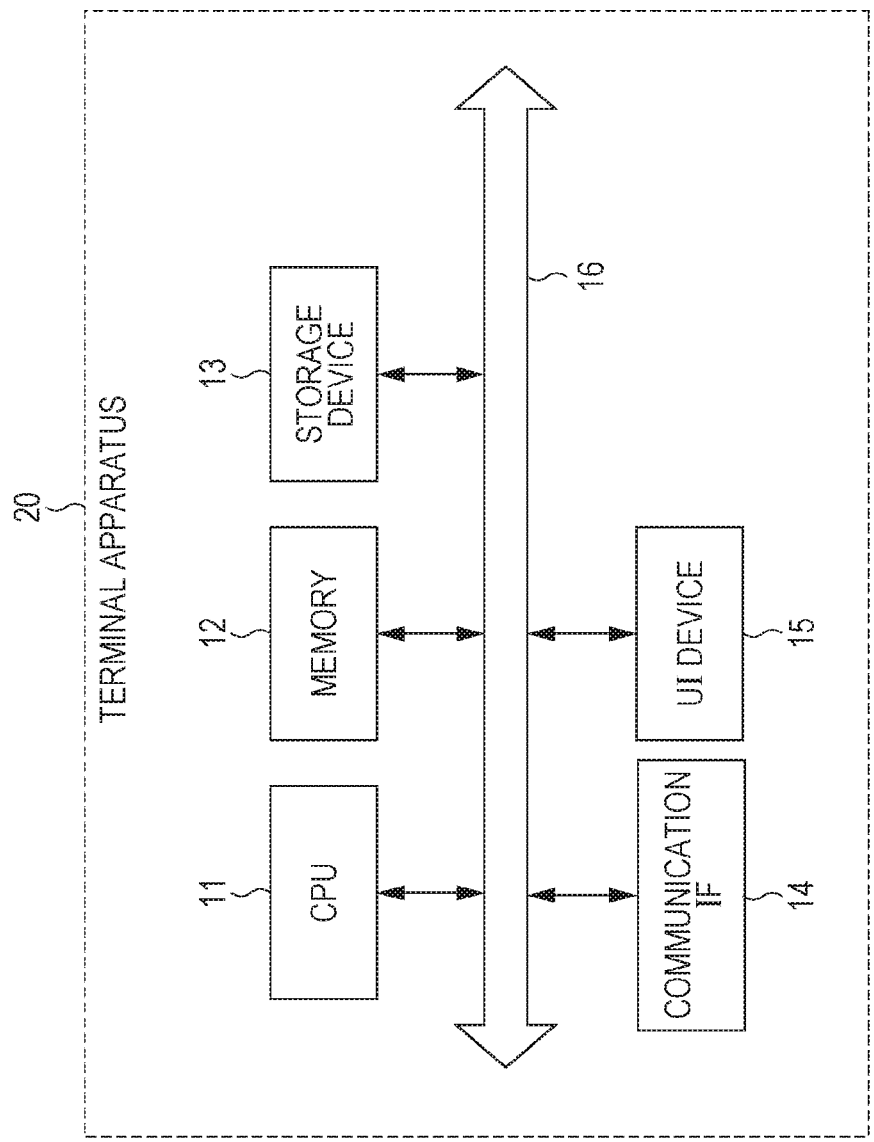
FIG. 3 is a block diagram illustrating a hardware configuration of a terminal apparatus according to the first exemplary embodiment of the present invention.

The terminal apparatus 20 performing such processing according to this exemplary embodiment has a hardware configuration illustrated in FIG. 3.

As illustrated in FIG. 3, the terminal apparatus 20 includes a central processing unit (CPU) 11, a memory 12, a storage device 13, which is, for example, a hard disk drive (HDD), a communication interface (IF) 14 used to transmit/receive data to/from an external apparatus and so on via a network, and a user interface (UI) device 15, which includes a touch panel, or a liquid crystal display and a keyboard. These constituent elements are connected to one another via a control bus 16.

The CPU 11 performs a predetermined process on the basis of a control program stored in the memory 12 or in the storage device 13 to control operations of the terminal apparatus 20. In this exemplary embodiment, it is assumed that the CPU 11 reads and executes the control program stored in the memory 12 or in the storage device 13 as described above; however, the control program may be stored in a storage medium, such as a compact disc read-only memory (CD-ROM) and provided to the CPU 11.

Figure 4:
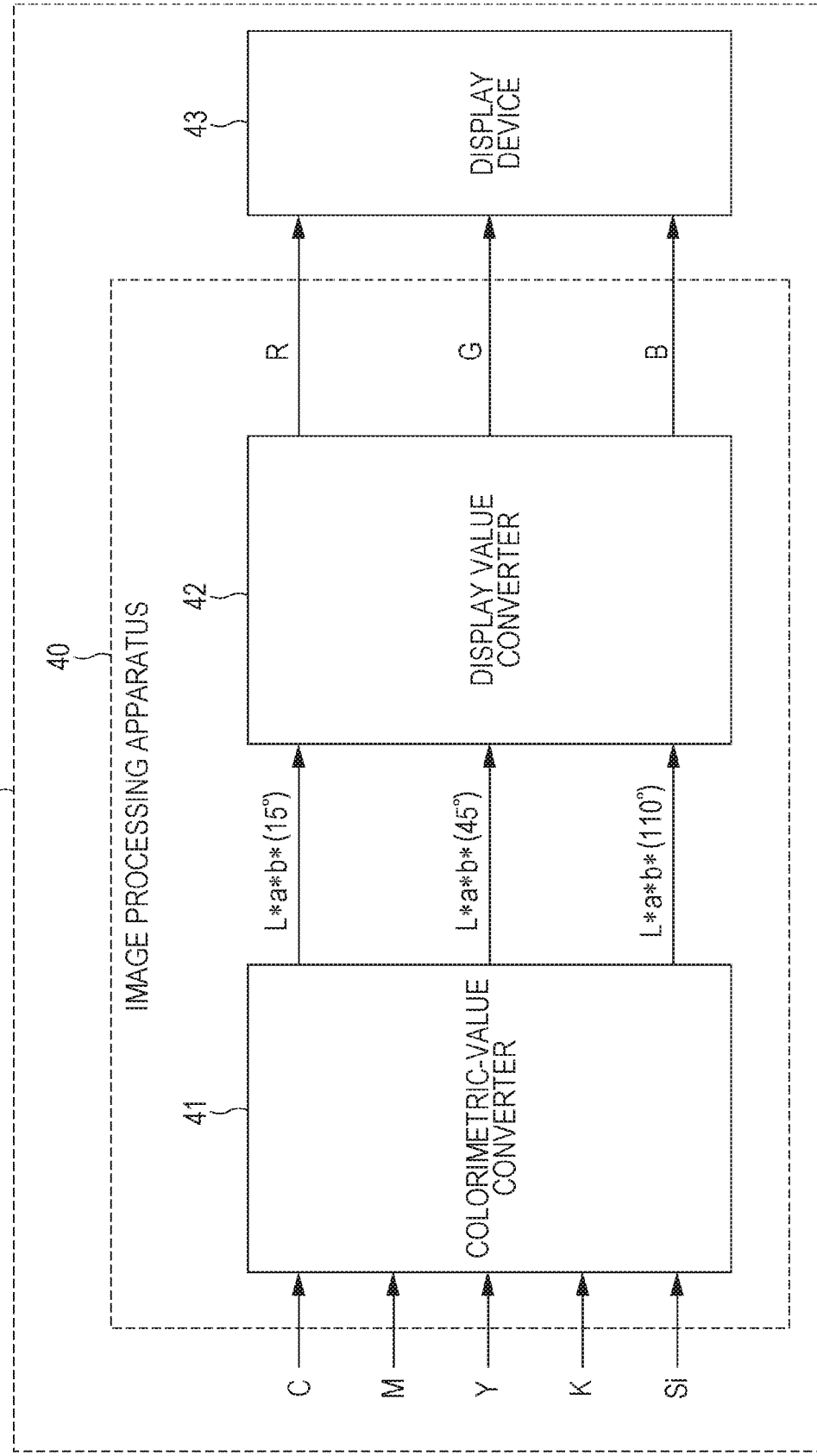
FIG. 4 is a block diagram illustrating a functional configuration of the terminal apparatus according to the first exemplary embodiment of the present invention.

FIG. 4 is a block diagram illustrating a functional configuration of the terminal apparatus 20 implemented by executing the above-described control program.

As illustrated in FIG. 4, the terminal apparatus 20 according to this exemplary embodiment includes an image processing apparatus 40 and a display device 43. The image processing apparatus 40 includes a colorimetric-value converter 41 and a display value converter 42.

The display device 43 is a device for displaying an image on the basis of specified R, G, and B values.

The image processing apparatus 40 performs a process for converting C, M, Y, K, and Si values (toner amounts) obtained from the image forming apparatus 10 to R, G, and B values for display on the display device 43.

Figure 5:
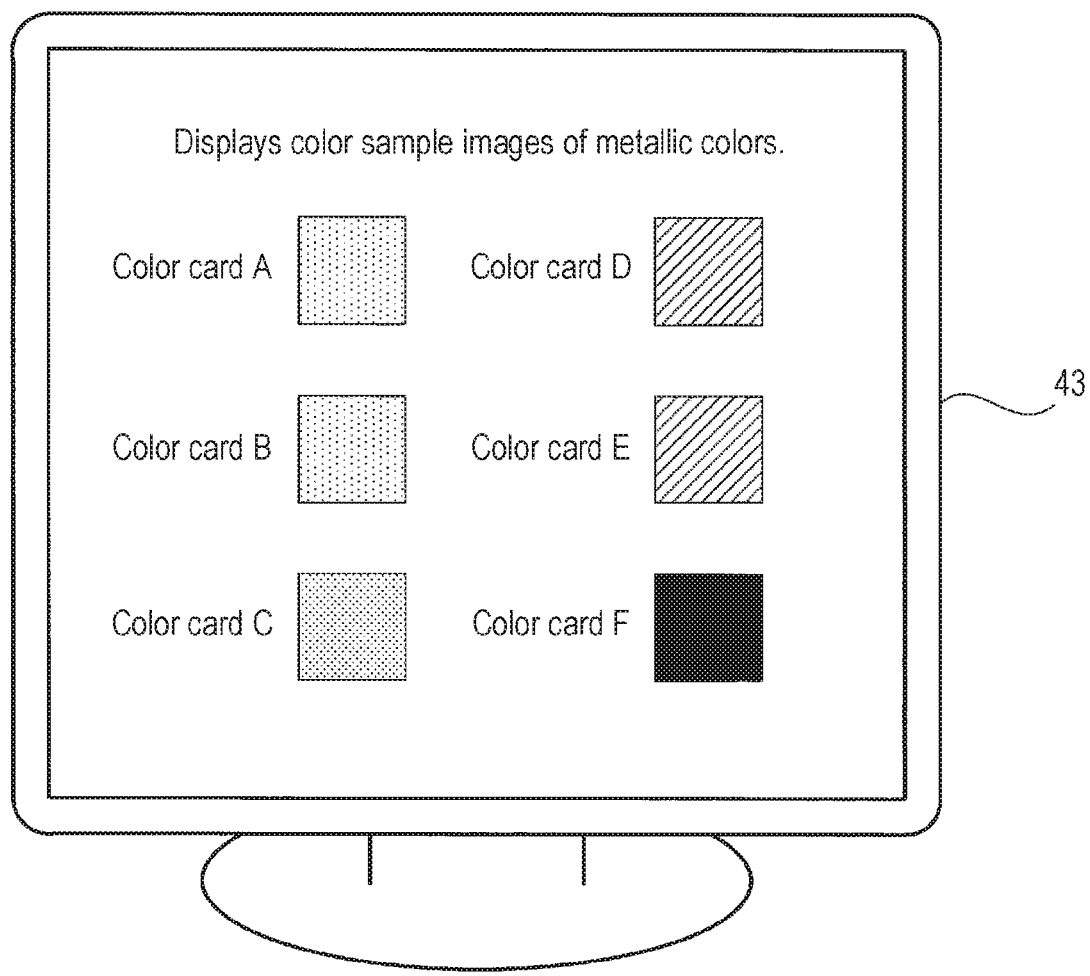
FIG. 5 is a diagram for describing a state where target color images based on color samples are displayed on a display device.

For example, as illustrated in FIG. 5, the image processing apparatus 40 performs a process for obtaining, from the image forming apparatus 10, and converting C, M, Y, K, and Si values for printing color sample images of extra colors to R, G, and B values to thereby display target color images based on the color sample images on the display device 43.

As the color sample images of extra colors, various color sample images of metallic colors provided by, for example, PANTONE (registered trademark) are used.

The colorimetric-value converter 41 converts C, M, Y, K, and Si values representing the toner amounts of plural toners including a silver toner Si, which is a luster coloring material, to plural colorimetric values obtained in a case of performing, in plural directions, a color measurement of a target color image printed using the plural toners.

Specifically, the colorimetric-value converter 41 converts input C, M, Y, K, and Si values, the C, M, Y, K, and Si values being used to print a target color image, to three colorimetric values L*a*b*(15°), L*a*b*(45°), and L*a*b*(110°) obtained in a case of performing a color measurement in three color measurement directions (15°, 45°, and 110°).

Then, the display value converter 42 converts the colorimetric values L*a*b*(15°), L*a*b* (45°), and L*a*b* (110°) in three color measurement directions obtained as a result of conversion by the colorimetric-value converter 41 to R, G, and B values, which are display values for displaying the target color image on the display device 43.

The details of the color measurement directions for which colorimetric values are generated by the colorimetric-value converter 41 are described with reference to FIG. 6.

Figure 6:
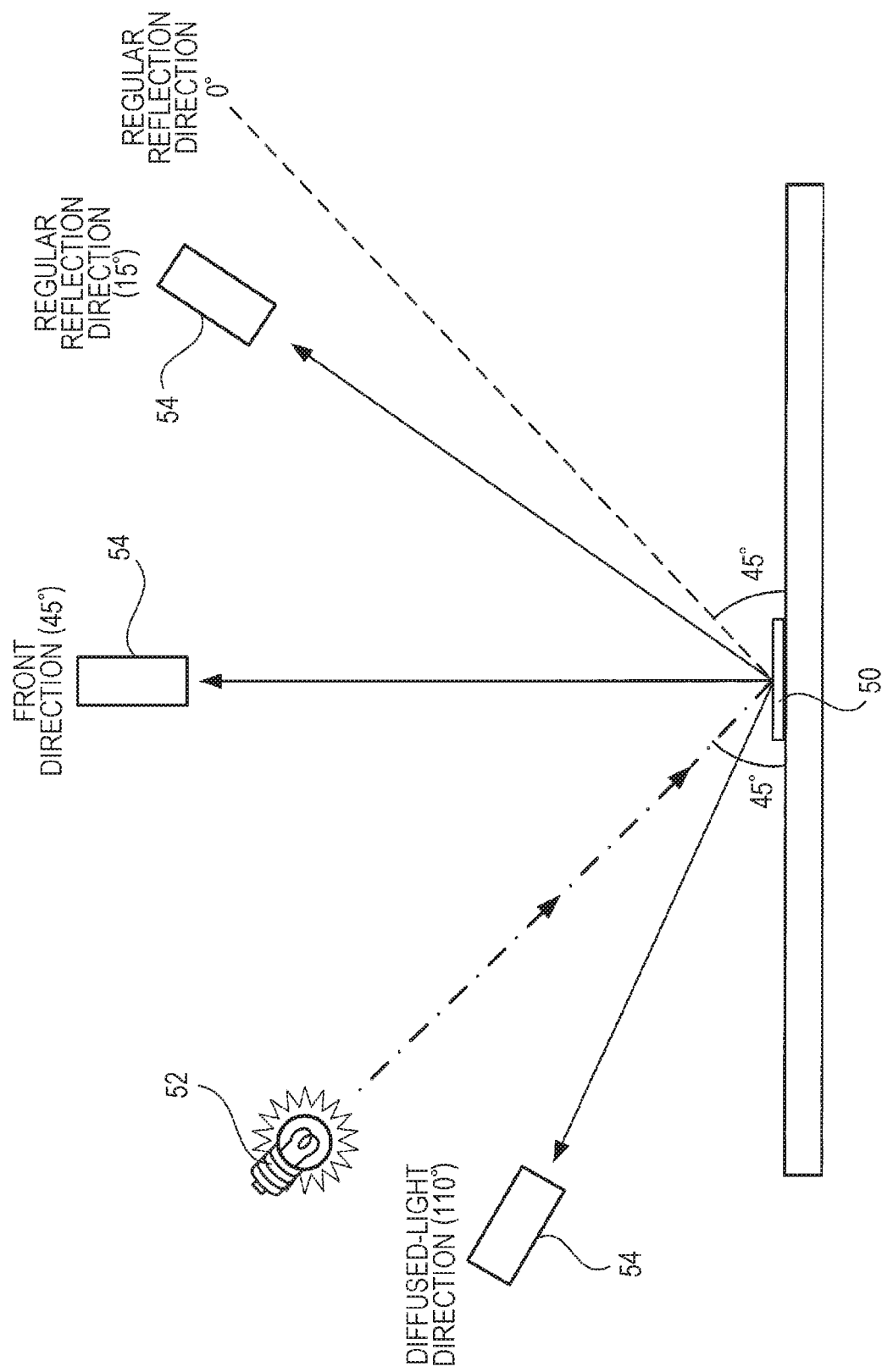
FIG. 6 is a diagram for describing a state where a color measurement of an image, such as a color sample of a metallic color, for which the color tone changes depending on the viewing direction is performed.

FIG. 6 is a diagram for describing a state where a color measurement of an image, such as a color sample of a metallic color, for which the color tone changes depending on the viewing direction is performed.

FIG. 6 illustrates a state where a color measurement of a measurement target image 50 is performed in color measurement directions at three angles (15°, 45°, and 110°), and specifically, illustrates a state where illumination light is emitted from a light source 52 to the measurement target image 50 in a diagonal direction at 45° and, when the regular reflection direction is assumed to correspond to 0° (reference direction), a color measurement is performed by a colorimeter 54 in directions at 15°, 45°, and 110°.

In FIG. 6, the direction at 45° is the front direction of (the direction normal to) the measurement target image 50. The direction at 15° is a regular reflection direction in which regular reflection light from the measurement target image 50 is measured. The regular reflection direction in which a color measurement of regular reflection light is performed is not set to the direction at 0° and is shifted by 15°. This is because, if a color measurement is performed in the direction at 0°, regular reflection light directly enters the colorimeter 54, and the color tone of the measurement target is unable to be measured.

In FIG. 6, the direction at 110° is set as a diffused-light direction in which diffused light from the measurement target image 50 is measured.

In this exemplary embodiment, the colorimetric-value converter 41 converts input C, M, Y, K, and Si values to colorimetric values obtained in a case of performing a color measurement in three color measurement directions. This exemplary embodiment is also applicable to a case of conversion to colorimetric values obtained in at least two directions, such as the front direction (45°) and the regular reflection direction (15°).

Now, a detailed configuration of the colorimetric-value converter 41 is described with reference to FIG. 7.

Figure 7:
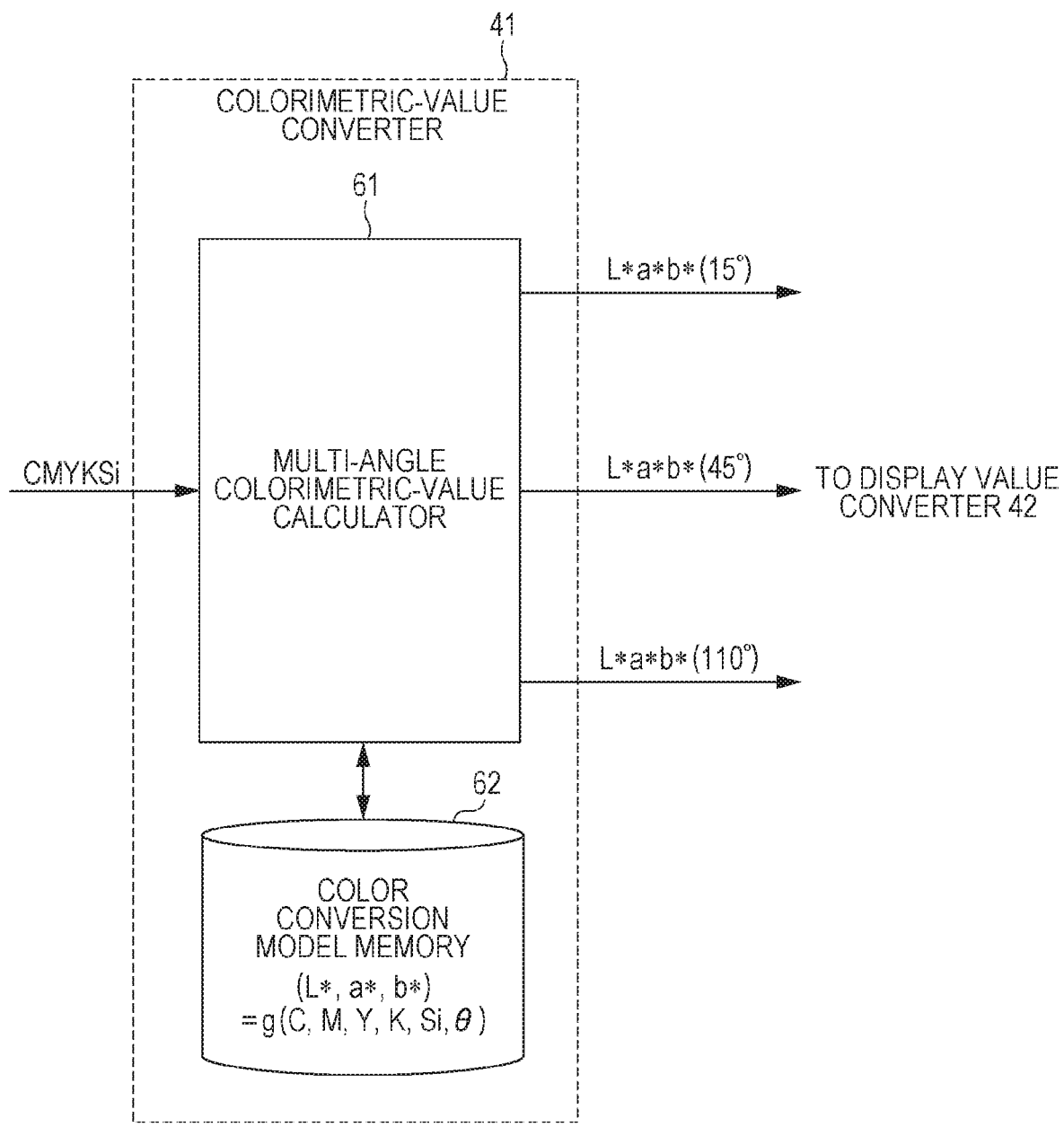
FIG. 7 is a diagram for describing a detailed configuration of a colorimetric-value converter illustrated in FIG. 4.

As illustrated in FIG. 7, the colorimetric-value converter 41 includes a multi-angle colorimetric-value calculator 61 and a color conversion model memory 62.

The color conversion model memory 62 stores a color conversion model (($L^*$, $a^*$, $b^*$)=g(C, M, Y, K, Si, θ)) in which combinations of color measurement directions and the toner amounts of the respective color toners are associated with colorimetric values obtained by measuring actual results of printing by a print device. This color conversion model is used to simulate a result of printing by a print device and is called a printer model (print-device color conversion model).

The multi-angle colorimetric-value calculator 61 uses the color conversion model stored in the color conversion model memory 62 to convert the toner amounts C, M, Y, K, and Si of plural toners including a silver toner to plural colorimetric values $L^*a^*b^*(15°)$, $L^*a^*b^*(45°)$, and $L^*a^*b^*(110°)$ obtained in a case of performing, in three color measurement directions, a color measurement of a target color image that is printed using the plural toners.

Figure 8:
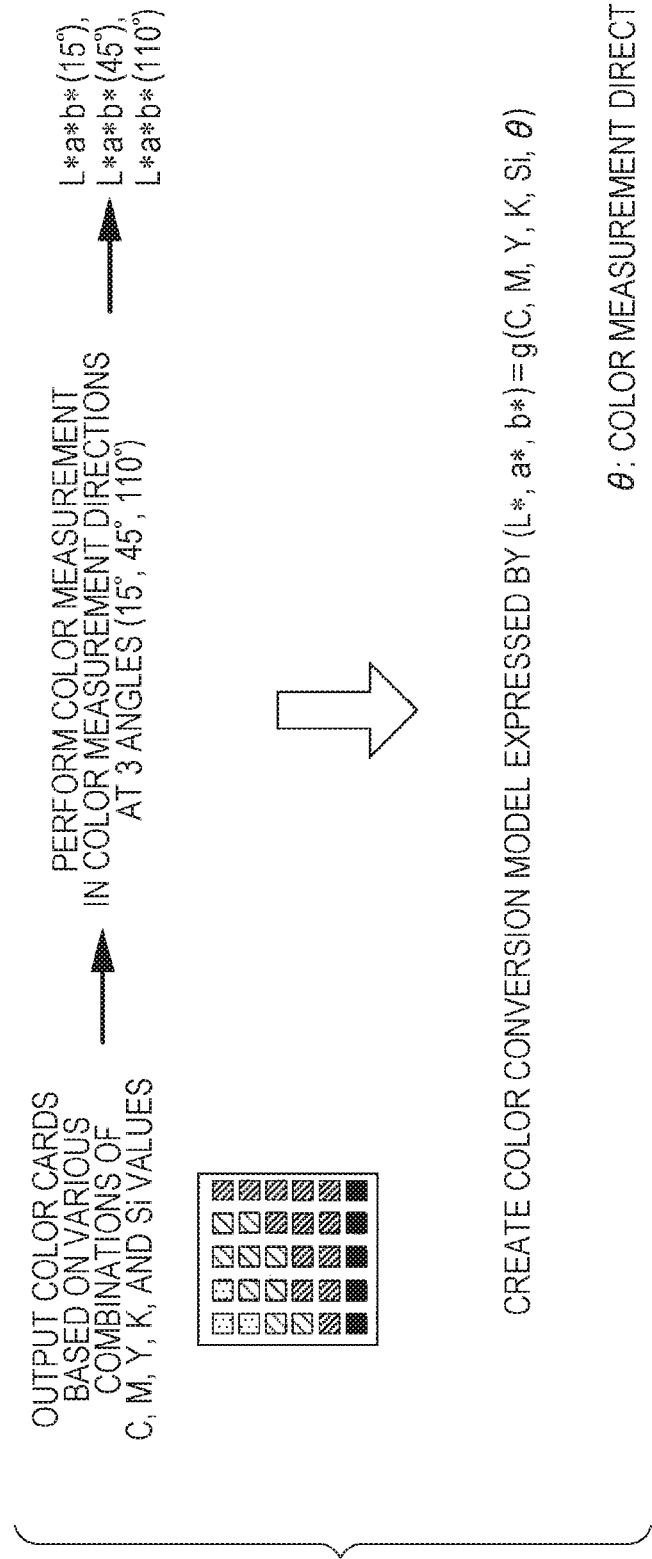
FIG. 8 is a diagram for describing a method for creating a color conversion model (printer model) that is stored in a color conversion model memory.

Now, a method for creating the color conversion model stored in the color conversion model memory 62 is described with reference to FIG. 8.

First, images of color cards (color patches) based on various combinations of C, M, Y, K, and Si values are output. Then, a color measurement of each color card is performed in color measurement directions at three angles (15°, 45°, and 110°) in accordance with the color measurement method as illustrated in FIG. 6. As a result, colorimetric values) $L^*a^*b^*(15°)$, $L^*a^*b^*(45°)$, and $L^*a^*b^*(110°)$ are obtained for each color card.

On the basis of these values, a color conversion model with which color values ($L^*$, $a^*$, and $b^*$) are obtained from input values C, M, Y, K, Si, and θ (color measurement direction) is created.

Specifically, colors reproduced on the basis of various combinations of C, M, Y, K, Si, and θ values are measured in advance to obtain $L^*$, $a^*$, and $b^*$ values to thereby obtain plural sets of values (C, M, Y, K, Si, and θ) and values ($L^*$, $a^*$, and $b^*$). These sets are used to obtain a functional relation expressed by ($L^*$, $a^*$, $b^*$)=g(C, M, Y, K, Si, θ), which is used as the color conversion model. When the color conversion model is used, and the toner amounts C, M, Y, K, and Si of the respective colors and the color measurement direction θ are provided, it is possible to obtain predicted color values $L^*$, $a^*$, and $b^*$. As the function used for this color conversion model, a function typically used as a color conversion model, such as multiple regression, a neural network, or interpolation using a direct look-up table, may be used.

Accordingly, the color conversion model (printer model) expressed by the function ($L^*$, $a^*$, $b^*$)=g(C, M, Y, K, Si, θ) is created, and the created conversion model is stored in the color conversion model memory 62.

Now, a detailed configuration of the display value converter 42 illustrated in FIG. 4 is described with reference to FIG. 9.

Figure 9:
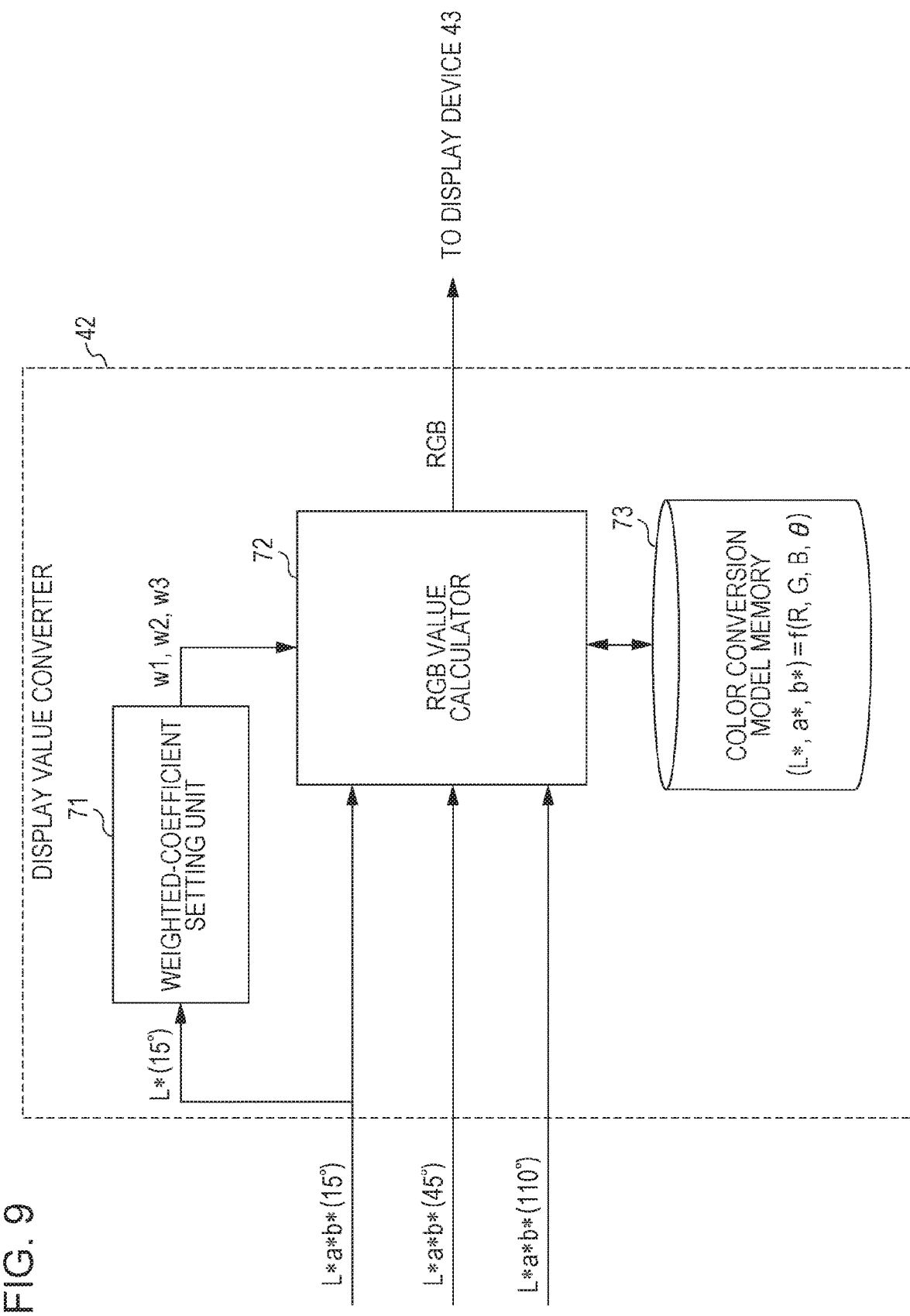
FIG. 9 is a diagram for describing a detailed configuration of a display value converter illustrated in FIG. 4.

As illustrated in FIG. 9, the display value converter 42 includes a weighted-coefficient setting unit 71, an RGB value calculator 72, and a color conversion model memory 73.

The color conversion model memory 73 stores a color conversion model ($L^*$, $a^*$, $b^*$)=f(R, G, B, θ) in which combinations of color measurement directions and R, G, and B values, which are the display values of the respective colors, are associated with colorimetric values obtained by actually performing color measurements on the display device 43. This color conversion model is used to simulate a result of display by a display device and is called a monitor model (display-device color conversion model).

Figure 10:
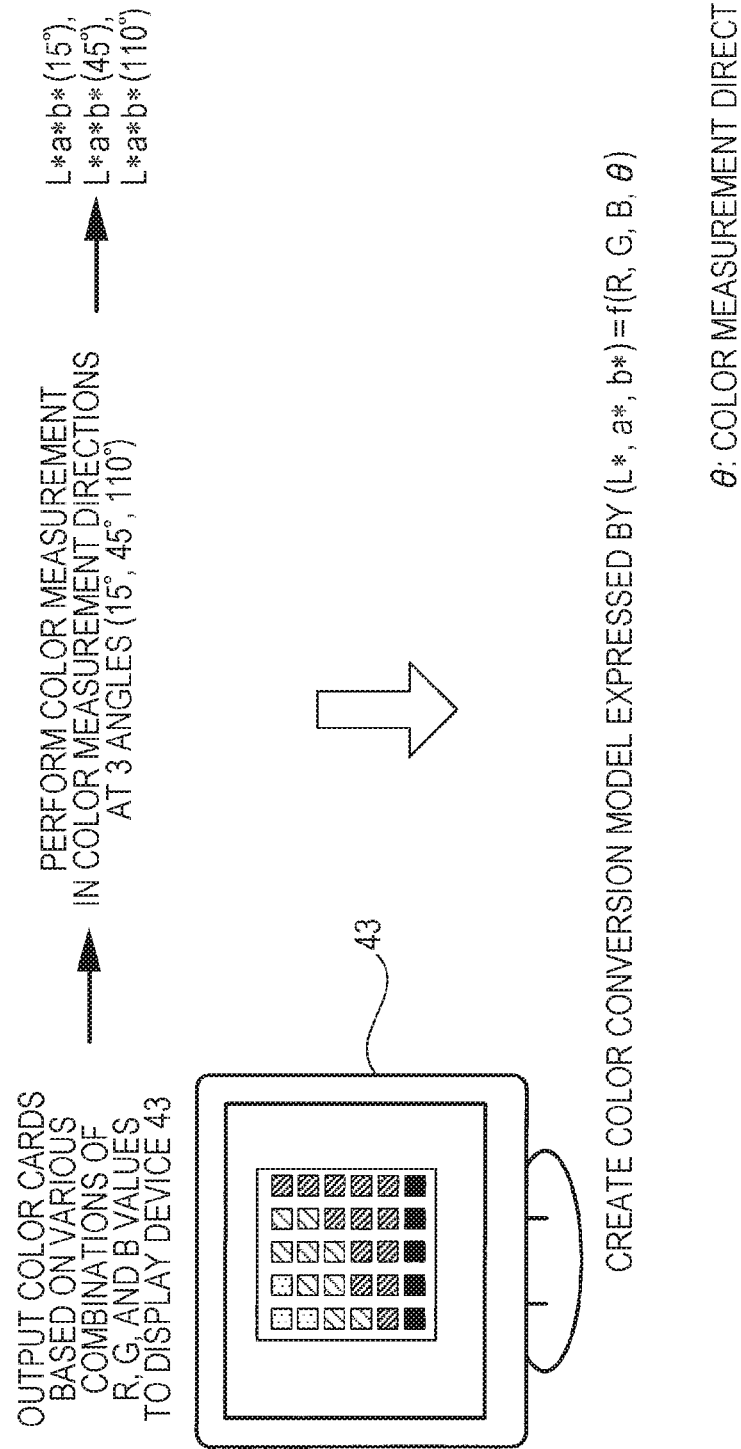
FIG. 10 is a diagram for describing a method for creating a color conversion model (monitor model) that is stored in a color conversion model memory.

Here, a method for creating the color conversion model stored in the color conversion model memory 73 is described with reference to FIG. 10.

First, images of color cards (color patches) based on various combinations of R, G, and B values are displayed on the display device 43. Then, a color measurement of each displayed color card is performed in color measurement directions at three angles (15°, 45°, and 110°) in accordance with the color measurement method as illustrated in FIG. 6. As a result, colorimetric values $L^*a^*b^*(15°)$, $L^*a^*b^*(45°)$, and $L^*a^*b^*(110°)$ are obtained for each color card.

Actually, in a case of a color measurement of an image displayed on a monitor screen, the obtained colorimetric values do not significantly change even if the color measurement direction changes. Therefore, $L^*a^*b^*(15°)=L^*a^*b^*(45°)=L^*a^*b^*(110°)$ may be assumed for simplification.

On the basis of these values, a color conversion model with which color values (L*, a*, and b*) are obtained from input values (R, G, B, and θ (color measurement direction)) is created.

Specifically, colors reproduced on the basis of various combinations of R, G, B, and θ values are measured in advance to obtain L*, a*, and b* values to thereby obtain plural sets of values (R, G, B, and θ) and values (L*, a*, and b*). These sets are used to obtain a functional relation expressed by (L*, a*, b*)=f(R, G, B, θ), which is used as the color conversion model. When the color conversion model is used, and R, G, and B values, which are display values, and the color measurement direction θ are provided, it is possible to obtain predicted color values L*, a*, and b*. As the function used for this color conversion model, a function typically used as a color conversion model, such as multiple regression, a neural network, or interpolation using a direct look-up table, may be used.

Accordingly, the color conversion model (monitor model) expressed by the function (L*, a*, b*)=f(R, G, B, θ) is created, and the created conversion model is stored in the color conversion model memory 73.

The RGB value calculator 72 calculates the weighted average ΔE(WAVG) of the color differences between the colorimetric values in three color measurement directions obtained as a result of conversion by the colorimetric-value converter 41 and colorimetric values in the respective color measurement directions obtained from the color conversion model (monitor model) stored in the color conversion model memory 73, and determines R, G, and B values for which the calculated weighted average ΔE(WAVG) of the color differences is minimized.

A specific example method for calculating the weighted average ΔE(WAVG) of the color differences is described with reference to FIG. 11. As illustrated in FIG. 11, the weighted average is calculated by using the following expression.

Weighted average ΔE(WAVG) of color differences in respective color measurement directions={w1×(color difference between)L*a*b*(15°) and f(R,G,B,15°))+w2×(color difference between)L*a*b*(45°) and f(R,G,B,45°))+w3×(color difference between)L*a*b*(110°) and f(R,G,B,110°))}/(w1+w2+w3)

Here, w1, w2, and w3 are a weighted coefficient in the regular reflection direction (15°), a weighted coefficient in the front direction (45°), and a weighted coefficient in the diffused-light direction (110°) respectively and set by the weighted-coefficient setting unit 71.

For example, in a case of processing color differences in the respective color measurement directions with the same weights, the weighted coefficients need to be set so as to satisfy w1=w2=w3=1. In this case, the weighted average ΔE(WAVG) of the color differences becomes a simple average.

The color difference ΔE(PQ) between a color value P=($L_1$*, $a_1$*, $b_1$*) and a color value Q=($L_2$*, $a_2$*, $b_2$*) is calculated by using the following expression.

$$\Delta E(PQ) = (({L_1}^* - {L_2}^*)^2 + ({a_1}^* - {a_2}^*)^2 + ({b_1}^* - {b_2}^*)^2)^{1/2}$$

As the specific method used by the RGB value calculator 72 to calculate R, G, and B values for which the weighted average ΔE(WAVG) of the color differences is minimized, a general method for addressing an optimization problem by applying a numerical solution for a nonlinear equation, such as the simplex method or the Newton's method, may be used.

In this exemplary embodiment, the description is given of the case where light is emitted to a target color image in a diagonal direction and where colorimetric values obtained in three color measurement directions are a colorimetric value L*a*b*(45°) obtained in a case of performing a color measurement in the front direction that is a direction normal to the target color image, a colorimetric value L*a*b*(15°) obtained in a case of performing a color measurement in the regular reflection direction relative to the illumination light, and a colorimetric value L*a*b*(110°) obtained in a case of performing a color measurement in the diffused-light direction.

Then, the weighted-coefficient setting unit 71 sets the weighted coefficients w1, w2, and w3 that are used to calculate the weighted average of the colorimetric values L*a*b*(15°, 45°, 110°) in the three color measurement directions on the basis of the luminance value (L*) of the colorimetric value L*a*b*(15°) in the regular reflection direction.

Specifically, in a case where the luminance value (L*) of the colorimetric value L*a*b*(15°) in the regular reflection direction is equal to or larger than a preset threshold, the weighted-coefficient setting unit 71 sets the weighted coefficients w1, w2, and w3 such that a weight to be attached to the colorimetric value L*a*b*(15°) in the regular reflection direction is relatively larger than weights to be attached to the colorimetric values L*a*b*(45°, 110°) in the other color measurement directions.

Figure 12:
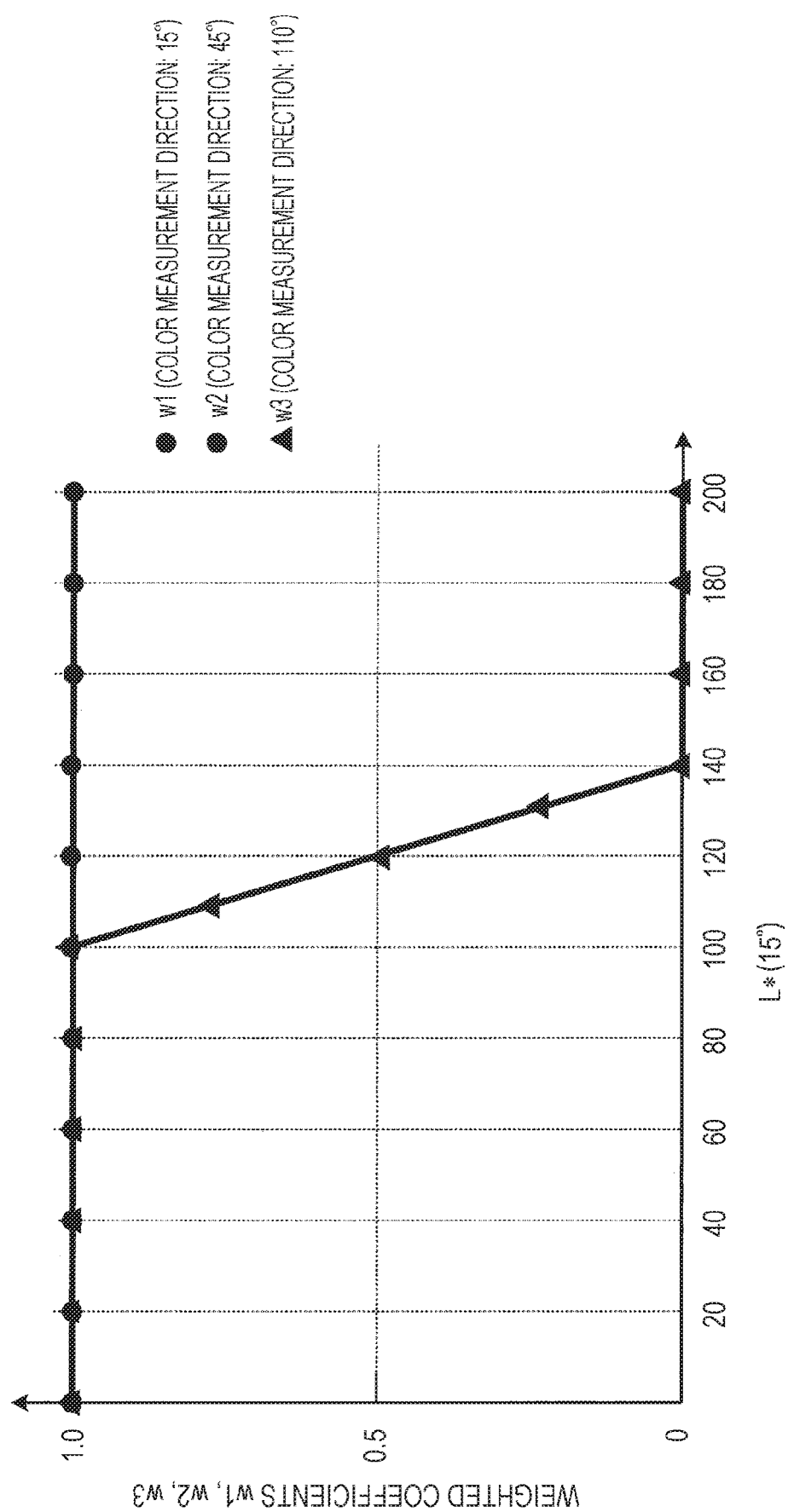
FIG. 12 is an example graph illustrating example settings of weighted coefficients w1, w2, and w3 set by a weighted-coefficient setting unit.

Example settings of the weighted coefficients w1, w2, and w3 set by the weighted-coefficient setting unit 71 are illustrated in FIG. 12 and FIG. 13.

The graph of example settings of the weighted coefficients illustrated in FIG. 12 represents a case where the weighted coefficient w3 for the color measurement direction at 110° decreases as the luminance value L*(15°) in the regular reflection direction increases while the weighted coefficients w1 and w2 for the color measurement directions at 15° and 45° are kept unchanged.

Specifically, the weighted coefficients w1 and w2 are set to 1 and kept unchanged regardless of the luminance value L*(15°) in the regular reflection direction, and the weighted coefficient w3 is set to 1 in a case where the luminance value L*(15°) in the regular reflection direction is equal to or smaller than 100, gradually decreases from 1 to 0 in a case where L*(15°) is between 100 and 140, and is set to 0 in a case where L*(15°) is equal to or larger than 140.

FIG. 13 is a table illustrating the example settings of the weighted coefficients w1, w2, and w3 illustrated in FIG. 12.

With reference to FIG. 12 and FIG. 13, the description has been given of the example settings in which the weighted coefficient w3 changes in accordance with the luminance value L*(15°) in the regular reflection direction. The weighted coefficient w1 may be set so as to increase as the luminance value L*(15°) in the regular reflection direction increases while the weighted coefficients w2 and w3 may be kept unchanged. In this case, the value of the weighted coefficient w1 is set to 1.1, 1.2, and so on and is larger than 1.

That is, the weighted coefficient w1 of the colorimetric value L*a*b*(15°) in the regular reflection direction needs to be set so as to be relatively larger than the weighted coefficients w2 and w3 of the colorimetric values L*a*b*(45°, 110°) in the other color measurement directions as the luminance value (L*) in the regular reflection direction increases.

The RGB value calculator 72 calculates the weighted average of the color differences in the respective color measurement directions by using the weighted coefficients w1, w2, and w3 set by the weighted-coefficient setting unit 71 and determines R, G, and B values for which the calculated weighted average is minimized.

The weighted coefficients w1, w2, and w3 are set as described above, and the RGB value calculator 72 converts the colorimetric values L*a*b*(15°, 45°, 110°) in the three color measurement directions obtained as a result of conversion by the colorimetric-value converter 41 to R, G, and B values for displaying the target color image on the display device 43 such that the luminance level of the obtained R, G, and B values is higher than the luminance level of the colorimetric value L*a*b*(45°) in the front direction by a larger degree as the luminance value)) (L*(15°)) of the colorimetric value L*a*b*(15°) in the regular reflection direction increases.

Specifically, in a case where the luminance value)) (L*(15°)) of the colorimetric value L*a*b*(15°) in the regular reflection direction is equal to or larger than a preset threshold, the RGB value calculator 72 converts the colorimetric values L*a*b*(15°, 45°, 110°) in the three color measurement directions obtained as a result of conversion by the colorimetric-value converter 41 to R, G, and B values for displaying the target color image on the display device 43 such that the luminance level of the obtained R, G, and B values is higher than the luminance level of the colorimetric value L*a*b*(45°) in the front direction.

In other words, the RGB value calculator 72 converts the three colorimetric values L*a*b*(15°, 45°, 110°) to R, G, and B values for displaying the target color image on the display device 43 such that the luminance level of the obtained R, G, and B values is higher than the luminance level in a case where the colorimetric values L*a*b*(15°, 45°, 110°) in the three color measurement directions are equally processed as the luminance value (L*(15°)) of the colorimetric value L*a*b*(15°) in the regular reflection direction increases.

That is, as the luminance value L*(15°) in the regular reflection direction increases, a weight to be attached to the colorimetric value L*a*b*(15°) in the regular reflection direction in which the luminance value is larger than that of the colorimetric values in the other color measurement directions is made larger to calculate R, G, and B values. Accordingly, the luminance value of the obtained R, G, and B values increases as the luminance value L*(15°) in the regular reflection direction increases.

In the example settings of the weighted coefficients illustrated in FIG. 12 and FIG. 13, the weighted coefficient w3 for the diffused-light direction is set so as to decrease if the luminance value L*(15°) in the regular reflection direction exceeds 100. This luminance value (100) is set to a value close to the luminance value of typical white paper. This is because, in a case where the luminance value L*(15°) in the regular reflection direction exceeds the luminance value of white paper, people sense metallic gloss. The luminance value (100) is set to a value between 90 and 96 or higher, which is the luminance value of white paper, and desirably, to a value larger than 100, which is the luminance value of a perfectly diffusing surface. The RGB value calculator 72 changes the magnitudes of the weighted coefficients w1, w2, and w3 in accordance with the magnitude of the luminance value L*(15°) in the regular reflection direction while using the luminance value of white paper as a threshold.

The processing as described above is performed to make a weight to be attached to the colorimetric value in the regular reflection direction larger for a target color image having a luminance level higher than the luminance level of white paper, thereby achieving a luminance level higher than a luminance level obtained by equally processing all colorimetric values (using the same weights). The reason for this is described below.

Figure 14:
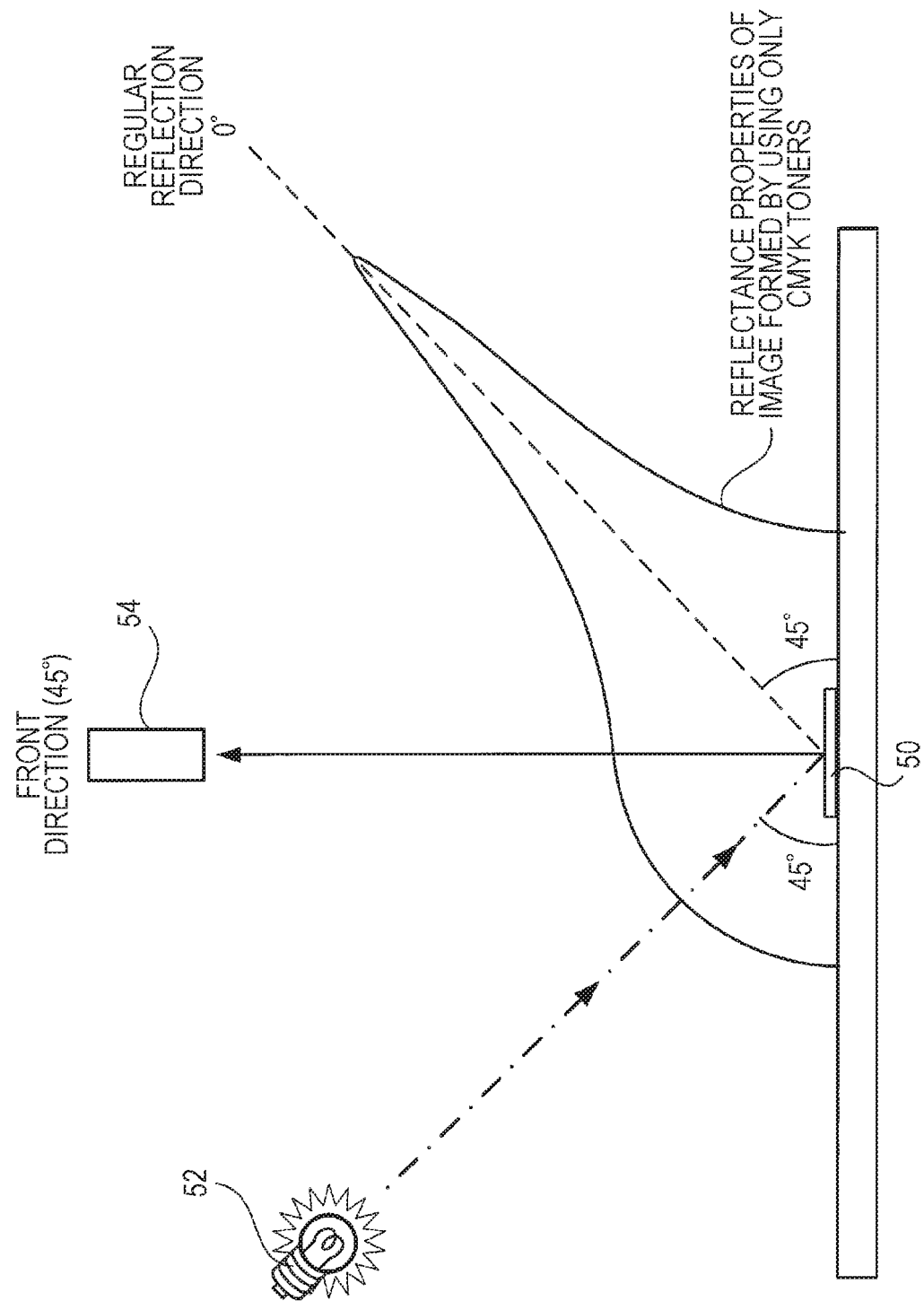
FIG. 14 is a diagram for describing the reflectance properties of an ordinary image of a non-metallic color.

First, the reflectance properties of an ordinary image of a non-metallic color are described with reference to FIG. 14. The reflectance properties of an ordinary image of a non-metallic color are as illustrated in FIG. 14. It is found that the amount of light in the regular reflection direction is larger than the amounts of light in the other directions and that the amounts of diffused light in the directions other than the regular reflection direction are substantially the same. Therefore, in an ordinary color measurement method, illumination light is emitted from the light source 52 to the measurement target image 50 in a diagonal direction, and color values in the front direction) (45°) are measured by the colorimeter 54.

Figure 15:
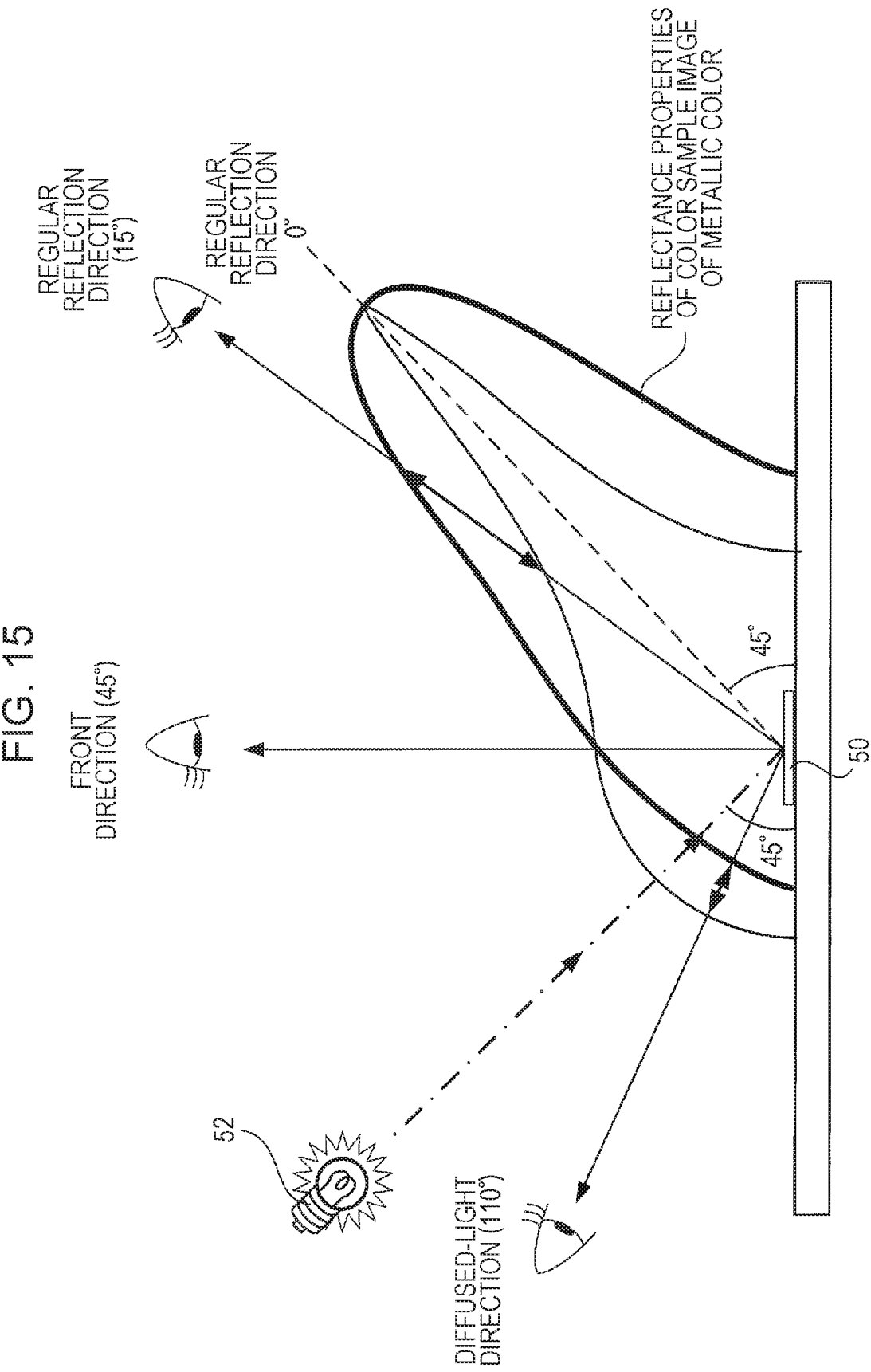
FIG. 15 is a diagram for describing differences in the reflectance properties between an ordinary image of a non-metallic-color and a color sample image of a metallic color.

Next, differences in the reflectance properties between an ordinary image of a non-metallic color and a color sample image of a metallic color are described with reference to FIG. 15.

Regarding a color sample image of a metallic color and an ordinary image, the luminance level of a color sample image of a metallic color is higher than that of an ordinary image in the regular reflection direction (15°) and lower than that of an ordinary image in the diffused-light direction (110°).

Therefore, the luminance level of a color sample image of a metallic color when viewed in the regular reflection direction (15°) is higher than the luminance level of an ordinary image of a non-metallic color. However, the difference in the luminance level between a color sample image of a metallic color and an ordinary image when viewed in the front direction (45°) is not so large. That is, the difference in the luminance level of a color sample image of a metallic color between the regular reflection direction) (15°) and the front direction (45°) is larger than that of an ordinary image.

An issue that arises due to the above-described fact in a case of calculating R, G, and B values on the basis of only a colorimetric value in the front direction (45°) for displaying a color sample image of a metallic color on a display device is described with reference to FIG. 16.

Figure 16:
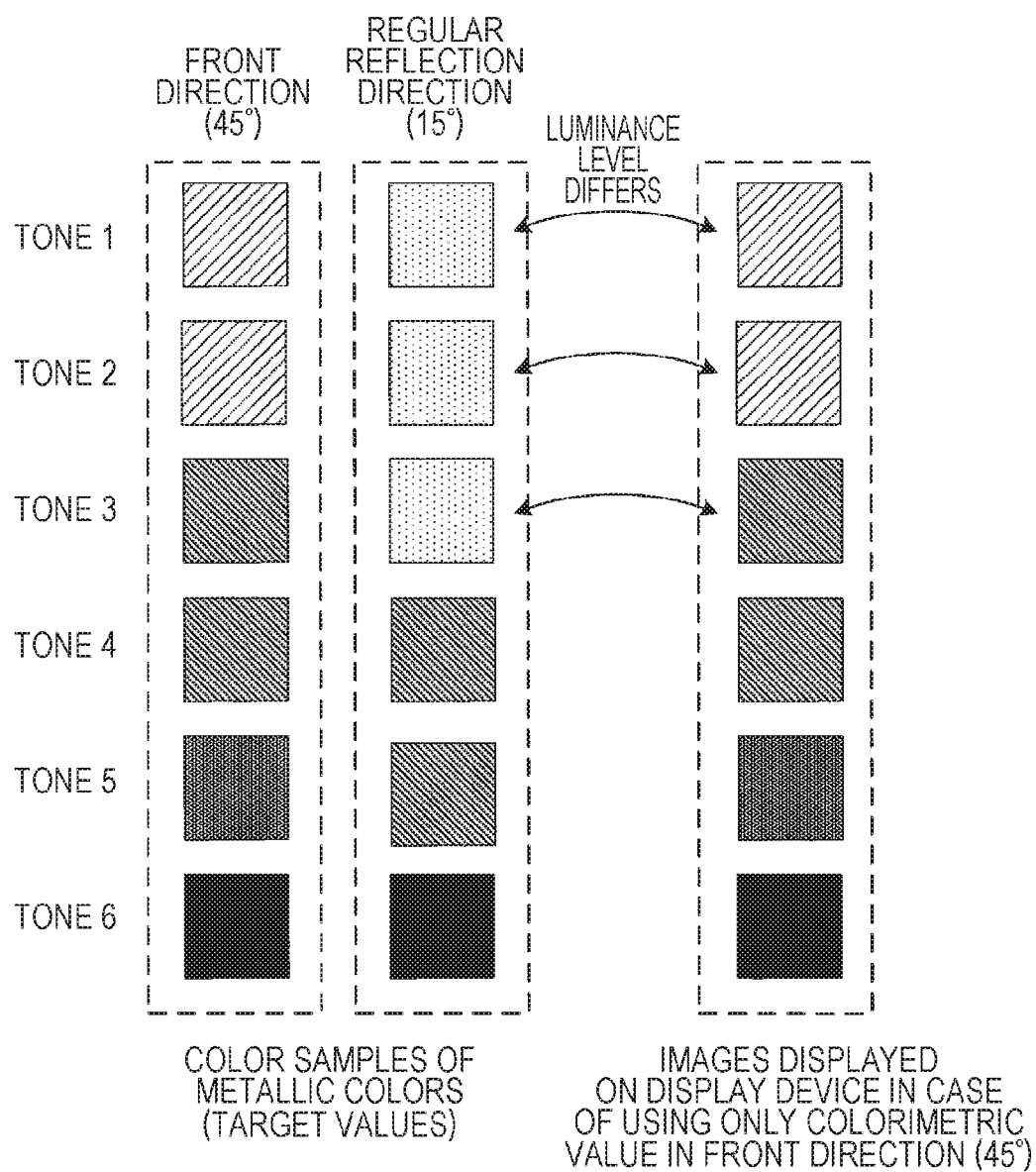
FIG. 16 is a diagram for describing an issue that arises in a case of calculating R, G, and B values for displaying a color sample image of a metallic color on a display device on the basis of only a colorimetric value in a front direction (45°)

It is found from FIG. 16 that the luminance level observed in a case of viewing an actual color sample image significantly differs between the front direction (45°) and the regular reflection direction (15°). Specifically, for the tones 1 to 3 for which the luminance level is high, the luminance level significantly differs between the front direction (45°) and the regular reflection direction (15°).

It is further found that, in a case of displaying, on a display device, a target color image to reproduce the color sample image by using only a colorimetric value obtained in the front direction (45°), it is possible to reproduce an image having a luminance level that is close to the luminance level observed in the front direction (45°); however, the luminance level of the reproduced image is lower than the luminance level observed in the regular reflection direction (15°).

Specifically, on a display device, such as a monitor, the color tone, luminance level, and so on of a displayed image hardly change regardless of the viewing direction, and therefore, the color tone, luminance level, and so on of the image displayed on the display device remain substantially the same even if the image is viewed in any direction.

Accordingly, in a case of comparing a color sample image for which the luminance level changes depending on the viewing direction and a target color image displayed on a display device, a user receives the impression that the target color image displayed on the display device has a low luminance level.

Figure 17:
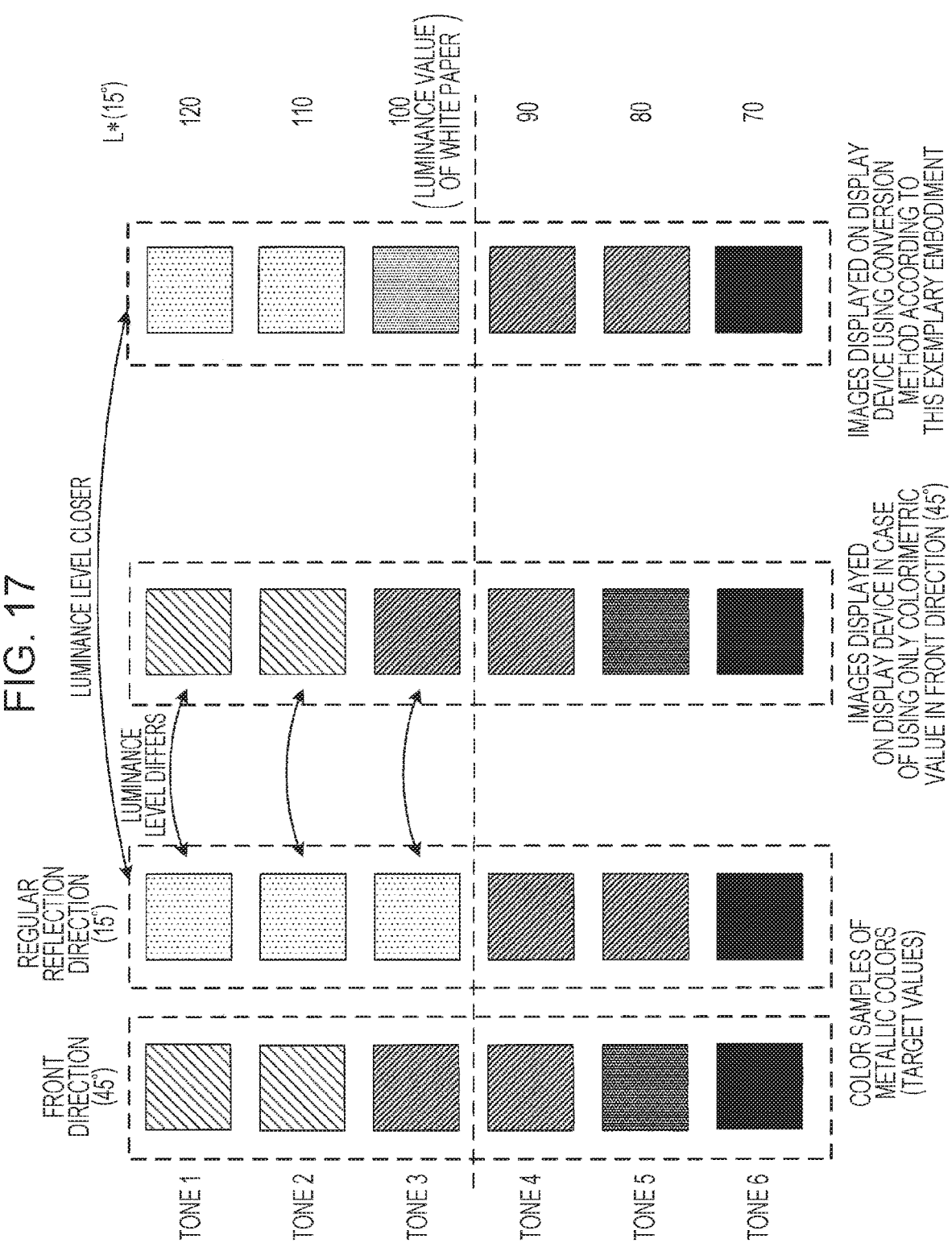
FIG. 17 is a diagram illustrating example images in a case of calculating R, G, and B values on the basis of colorimetric values in plural color measurement directions, namely, the front direction (45°), a regular reflection direction (15°), and a diffused-light direction (110°), according to an exemplary embodiment of the present invention.

However, in this exemplary embodiment, R, G, and B values are calculated on the basis of colorimetric values in plural color measurement directions, namely, the front direction (45°), the regular reflection direction (15°), and the diffused-light direction (110°), instead of only in the front direction (45°), as illustrated in FIG. 17. Therefore, the luminance level of the image based on the calculated R, G, and B values is higher than that obtained in a case of using only a colorimetric value in the front direction (45°).

As a result, a user receives the impression that the target color image displayed on the display device 43 on the basis of the R, G, and B values obtained by using the conversion method according to this exemplary embodiment is closer to the actual color sample image.

Specifically, in the conversion method according to this exemplary embodiment, in a case where the luminance value $L^*(15°)$ in the regular reflection direction is equal to or higher than 100 (tones 1 to 3), an attached weight is further made larger for the regular reflection direction) (15°) to thereby further increase the luminance level of the image based on the calculated R, G, and B values.

Regarding a target color image having a luminance level higher than the luminance level of white paper, the difference from the luminance level observed in the regular reflection direction (15°) is likely to be larger than the difference from the luminance level observed in the front direction (45°). Therefore, when R, G, and B values for display on the display device 43 are calculated on the basis of only a colorimetric value in the front direction (45°), a user who compares the actual color sample image with the target color image displayed on the display device 43 is highly likely to receive the impression that the target color image displayed on the display device 43 is dark.

Accordingly, for a target color image having a luminance level that is higher than the luminance level of white paper, a weight to be attached to a colorimetric value in the regular reflection direction (15°) is made larger to thereby calculate R, G, and B values with which the luminance level of the obtained image increases instead of simply processing plural colorimetric values in different color measurement directions equally to calculate R, G, and B values. As a result, a user who compares the actual color sample image with the target color image displayed on the display device 43 has the impression that the target color image is closer to the actual color sample image.

Second Exemplary Embodiment

Now, a print system according to a second exemplary embodiment of the present invention is described.

Figure 18:
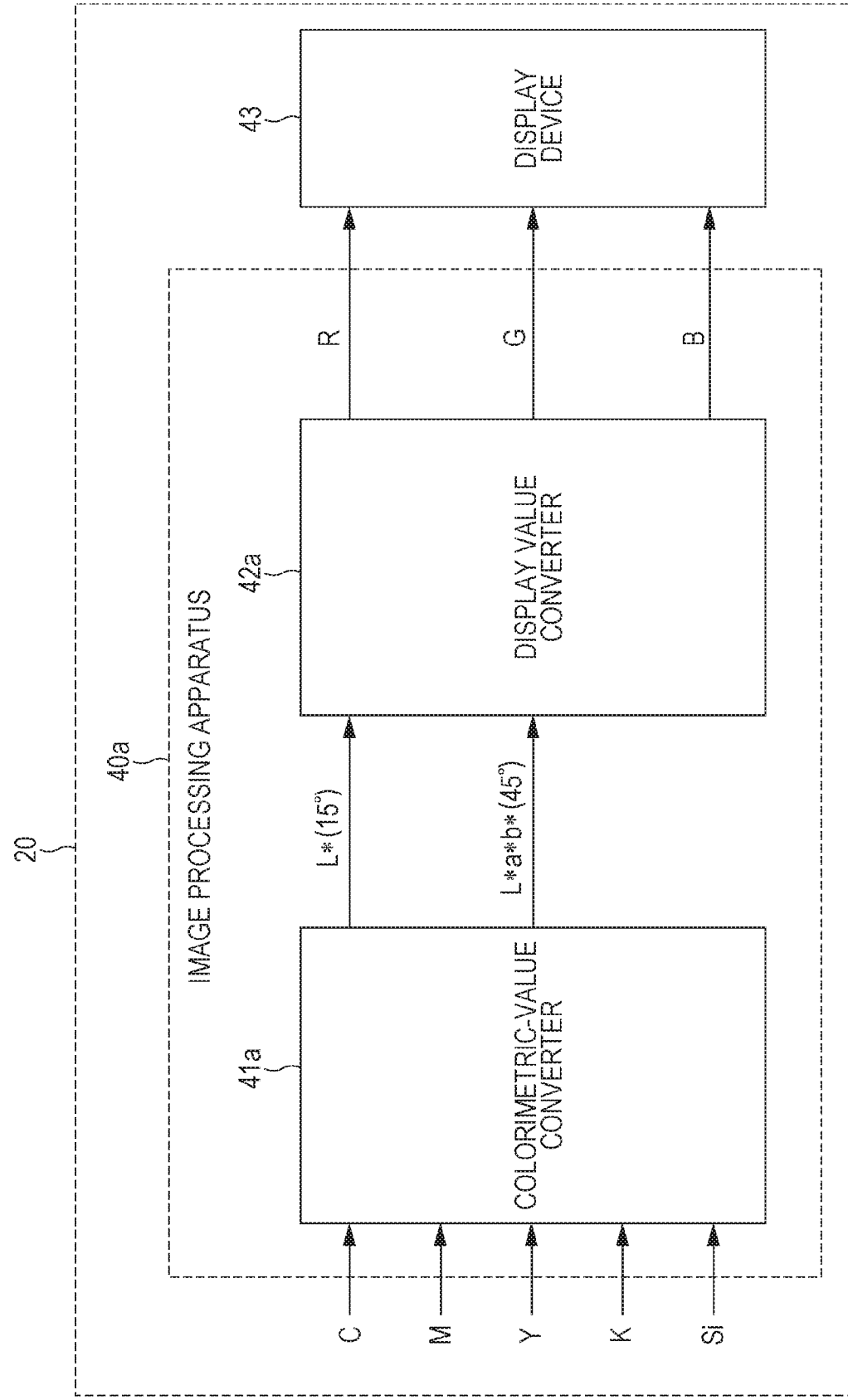
FIG. 18 is a diagram for describing a configuration of an image processing apparatus according to a second exemplary embodiment of the present invention.

The print system according to this exemplary embodiment is based on the print system according to the first exemplary embodiment described above and has a configuration in which the image processing apparatus 40 included in the terminal apparatus 20 is replaced by an image processing apparatus 40a illustrated in FIG. 18.

As illustrated in FIG. 18, the image processing apparatus 40a includes a colorimetric-value converter 41a and a display value converter 42a.

The colorimetric-value converter 41a according to this exemplary embodiment converts input C, M, Y, K, and Si values to a colorimetric value $L^*a^*b^*(15°)$ obtained in a case of performing a color measurement of a target color image printed on the basis of the C, M, Y, K, and Si values in the regular reflection direction, and a colorimetric value $L^*a^*b^*(45°)$ obtained in a case of performing a color measurement of the target color image in the front direction.

The display value converter 42a converts the colorimetric value $L^*a^*b^*(45°)$ in the front direction obtained as a result of conversion by the colorimetric-value converter 41a to R, G, and B values for displaying the target color image on the display device 43 such that the luminance level of the obtained R, G, and B values is higher than the luminance level of the colorimetric value in the front direction as the luminance value $L^*(15°)$ of the colorimetric value in the regular reflection direction increases.

Now, a detailed configuration of the display value converter 42a illustrated in FIG. 18 is described with reference to FIG. 19.

Figure 19:
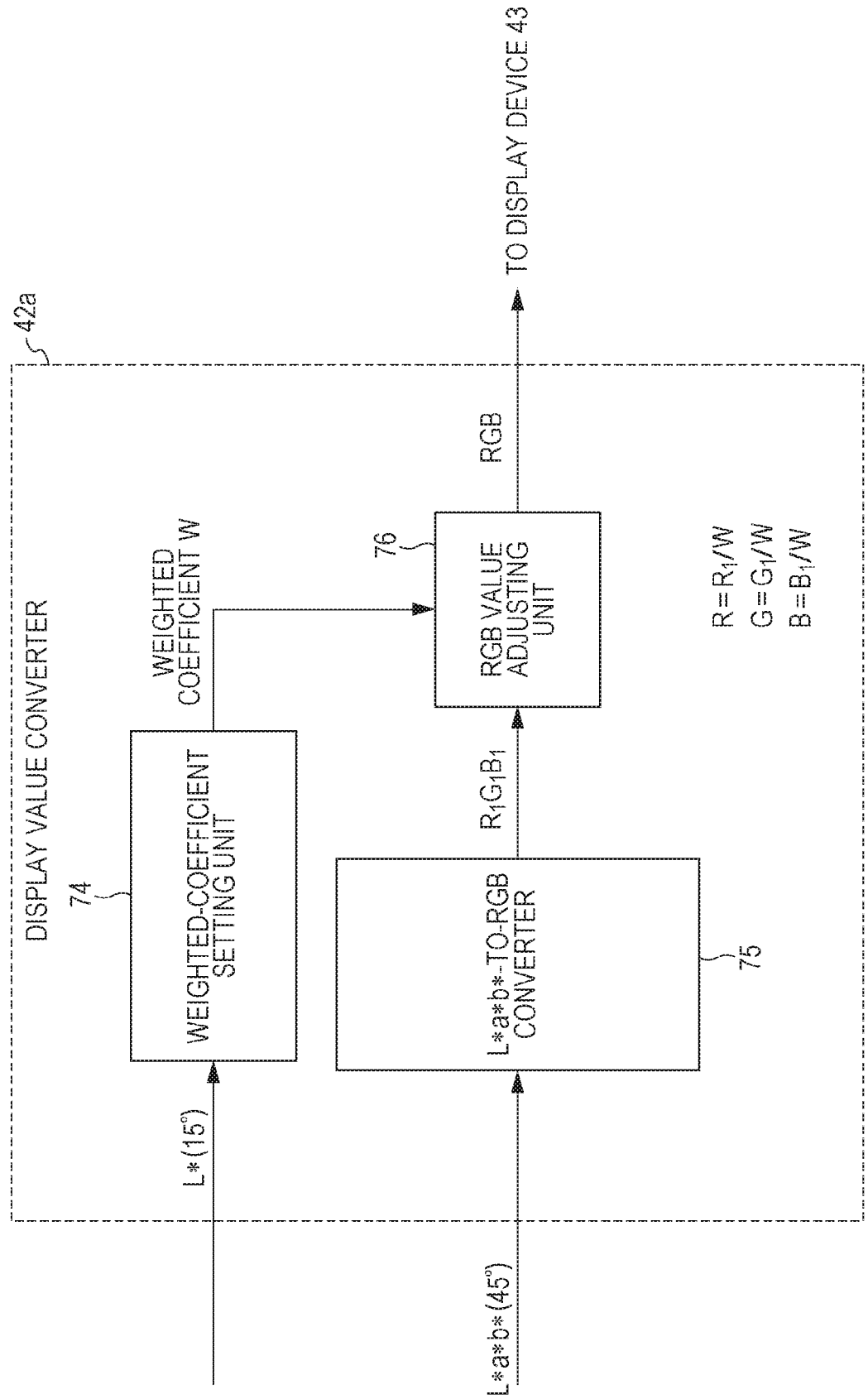
FIG. 19 is a diagram for describing a detailed configuration of a display value converter illustrated in FIG. 18.

As illustrate in FIG. 19, the display value converter 42a includes a weighted-coefficient setting unit 74, an $L^*a^*b^*$-to-RGB converter 75, and an RGB value adjusting unit 76.

The weighted-coefficient setting unit 74 sets a weighted coefficient W to a value that gradually decreases from 1 in a case where the luminance value ($L^*(15°)$) of the colorimetric value in the regular reflection direction is equal to or larger than a preset threshold, for example, 100 (the luminance value of white paper).

Figure 20:
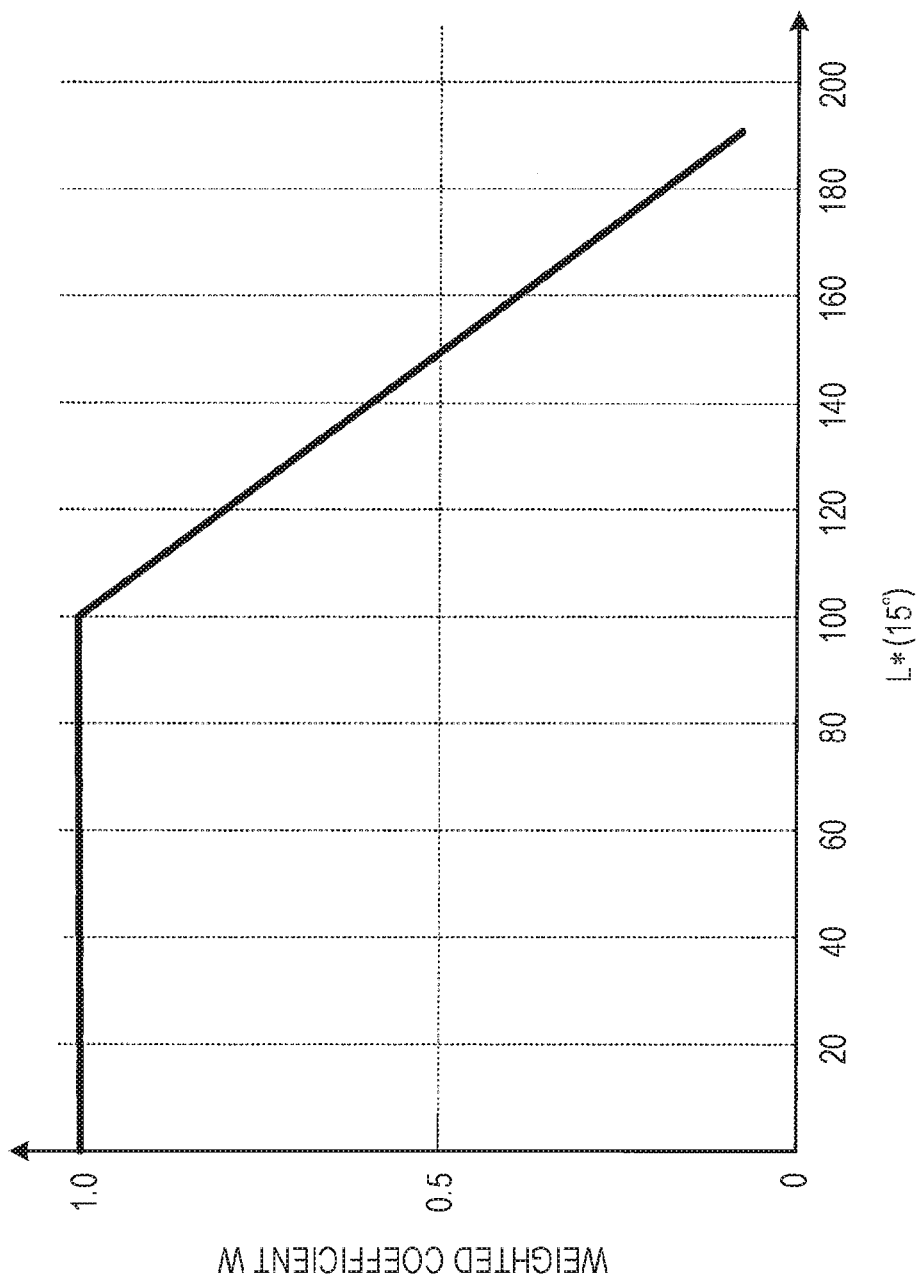
FIG. 20 is a graph illustrating an example setting of a weighted coefficient W set by a weighted-coefficient setting unit.

FIG. 20 illustrates an example setting of the weighted coefficient W set by the weighted-coefficient setting unit 74.

It is found from FIG. 20 that the weighted coefficient W is equal to 1 in a case where the luminance value)) ($L^*(15°)$) in the regular reflection direction is equal to or smaller than 100, which is the luminance value of white paper, and gradually decreases to a smaller value in a case where the luminance value ($L^*(15°)$) exceeds 100.

The $L^*a^*b^*$-to-RGB converter 75 converts an input colorimetric value $L^*a^*b^*(45°)$ in the front direction to R, G, and B values ($R_1$, $G_1$, $B_1$).

The RGB value adjusting unit 76 adjusts the R, G, and B values ($R_1$, $G_1$, $B_1$) from the $L^*a^*b^*$-to-RGB converter 75 by using the weighted coefficient W set by the weighted-coefficient setting unit 74. Specifically, the RGB value adjusting unit 76 performs arithmetic operations as described below to adjust the R, G, and B values ($R_1$, $G_1$, $B_1$) and outputs the adjusted R, G, and B values as R, G, and B values for displaying a target color image on the display device 43.

$$R=R_1/W$$

$$G=G_1/W$$

$$B=B_1/W$$

The display value converter 42a included in the image processing apparatus 40a according to this exemplary embodiment need not create and store in advance a color conversion model (monitor model) unlike the display value converter 42 according to the first exemplary embodiment described above. Further, the display value converter 42a needs to perform only simple division as indicated above in a case of calculating R, G, and B values for output to the display device 43, resulting in a lighter processing load. As a result, the display value converter 42a according to this exemplary embodiment has a configuration simpler than that of the display value converter 42 according to the first exemplary embodiment.

Modifications

The exemplary embodiments have been described above while using the case where colorimetric values are represented by a CIE $L^*a^*b^*$ color space, which is a color system that includes at least luminance information; however, any color system represented by another color space, such as the L*c*h color system, may be used as long as the color system includes luminance information.

In the above-described exemplary embodiments, the case has been described where the toner amounts of the respective color toners including a silver toner are converted to colorimetric values in the color measurement directions at three angles, namely, the regular reflection direction (15°), the front direction (45°), and the diffused-light direction) (110°), to calculate R, G, and B values for display on the display device 43. However, exemplary embodiments of the present invention are not limited to such a case. The toner amounts of the respective color toners including a silver toner may be converted to colorimetric values in color measurement directions at multiple angles, such as four angles or five angles, more than three angles to calculate R, G, and B values for display on the display device 43. FIG. 21 illustrates an example case where a color measurement of the measurement target image 50 is performed in color measurement directions at five angles, namely, the regular reflection direction (15°), a regular reflection direction) (25°), the front direction (45°), a diffused-light direction) (75°), and the diffused-light direction (110°).

When colorimetric values in the color measurement directions at five angles obtained in accordance with the color measurement method as illustrated in FIG. 21 are used, it is also possible to calculate R, G, and B values for displaying the target color image on the display device 43 by using a method similar to the method described above.

That is, the colorimetric-value converter 41 may convert input C, M, Y, K, and Si values to a colorimetric value of the target color image measured in the direction) (25°) closer to the regular reflection direction (15°) than to the front direction (45°) and a colorimetric value of the target color image measured in the diffused-light direction) (75°) between the front direction (45°) and the illumination direction of the light source 52 in addition to colorimetric values in the regular reflection direction (15°), the front direction (45°), and the diffused-light direction (110°). Then, the display value converter 42 needs to use the colorimetric values in such plural color measurement directions to calculate R, G, and B values for displaying the target color image on the display device 43.

Further, the exemplary embodiments have been described above while using the case where the exemplary embodiments are applied to an image forming apparatus that performs printing by using a metallic (metallic gloss color) toner, such as a silver toner or a gold toner; however, the exemplary embodiments of the present invention are not limited to this case. The exemplary embodiments of the present invention are also applicable to a case where printing is performed by using a luster coloring material, such as a pearly coloring material other than toners, which produces a color tone that changes depending on the viewing direction.

The exemplary embodiments have been described above while using the case where a target color image that is printed using toners of plural colors including a silver toner Si, namely, C, M, Y, K, and Si toners, is simulated and displayed on a display device; however, the exemplary embodiments of the present invention are not limited to this case. The exemplary embodiments of the present invention are also applicable to a case where an image represented by C, M, Y, K, and Si values is simulated and printed by a printer using only toners of basic colors, such as C, M, Y, and K toners.

In this case, a converter that calculates C, M, Y, and K values on the basis of colorimetric values L*a*b*(15°, 45°, 110°) in plural color measurement directions needs to be provided in place of the display value converter 42. Then, the converter needs to perform a process for converting colorimetric values in plural color measurement direction to C, M, Y, and K values by using a printer model generated on the basis of a print device that performs printing using only toners of basic colors, namely, C, M, Y, and K toners, instead of a color conversion model that is a monitor model.

Further, a configuration may be employed in which R, G, and B values obtained by the display value converter 42 are converted to L*a*b* values again, and the L*a*b* values are converted to C, M, Y, and K values to thereby allow a printer using only toners of basic colors to simulate printing of the target color image represented by C, M, Y, K, and Si values.

Further, the conversion processes performed by the colorimetric-value converter 41 and the display value converter 42 or by the colorimetric-value converter 41a and the display value converter 42a described in the first and second exemplary embodiments may be put together to generate a 5-input 3-output look-up table to which C, M, Y, K, and Si values are input and from which R, G, and B values are output.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    at least one processor configured to execute:
        a first converter that converts amounts of coloring materials including a luster coloring material to colorimetric values obtained by performing, in color measurement directions, a color measurement of a target color image printed using the coloring materials; and
        a second converter that converts the colorimetric values obtained from conversion by the first converter to display values for displaying the target color image on a display device,
    wherein the image processing apparatus further comprises a memory configured to store a display-device color conversion model in which combinations of color measurement directions and display values of respective colors are associated with colorimetric values actually measured on the display device, and
    wherein the second converter determines display values for which a weighted average of color differences between the colorimetric values in the respective color measurement directions obtained from conversion by the first converter and colorimetric values in the respective color measurement directions obtained from the display-device color conversion model is minimized.

2. The image processing apparatus according to claim 1, wherein the first converter converts the amounts of the coloring materials including the luster coloring material to colorimetric values obtained in a case of performing, in color measurement directions, a color measurement of a target color image printed using the coloring materials by using a print-device color conversion model in which combinations of color measurement directions and amounts of coloring materials of respective colors are associated with colorimetric values obtained by measuring actual results of printing by a print device.

3. The image processing apparatus according to claim 1, wherein the luster coloring material is a metallic gloss color toner.

4. The image processing apparatus according to claim 1, wherein the colorimetric values include, in a case of illuminating the target color image with illumination light in a diagonal direction, a colorimetric value obtained in a case of performing a color measurement in a front direction that is a direction normal to the target color image and a colorimetric value obtained in a case of performing a color measurement in a regular reflection direction relative to the illumination light,
wherein the second converter further includes a weighted-coefficient setting unit that sets weighted coefficients such that, among the weighted coefficients, a weighted coefficient of the colorimetric value in the regular reflection direction is relatively larger than a weighted coefficient of a colorimetric value in a color measurement direction other than the regular reflection direction in a case where a luminance value of the colorimetric value in the regular reflection direction is equal to or larger than a threshold, and
wherein the second converter uses the weighted coefficients set by the weighted-coefficient setting unit to calculate the weighted average of the color differences in the respective color measurement directions.

5. The image processing apparatus according to claim 1, wherein the colorimetric values include, in a case of illuminating the target color image with illumination light in a diagonal direction, a colorimetric value obtained in a case of performing a color measurement in a front direction that is a direction normal to the target color image and a colorimetric value obtained in a case of performing a color measurement in a regular reflection direction relative to the illumination light, and
wherein the second converter converts the colorimetric values obtained from conversion by the first converter to display values for displaying the target color image on a display device such that a luminance level of the obtained display values is higher than a luminance level of the colorimetric value in the front direction by a larger degree as a luminance value of the colorimetric value in the regular reflection direction increases.

6. The image processing apparatus according to claim 5, wherein the second converter converts the colorimetric values obtained from conversion by the first converter to display values for displaying the target color image on a display device such that the luminance level of the obtained display values is higher than the luminance level of the colorimetric value in the front direction by a larger degree in a case where the luminance value of the colorimetric value in the regular reflection direction is equal to or larger than a threshold.

7. The image processing apparatus according to claim 4, wherein the threshold is a luminance value of white paper.

8. The image processing apparatus according to claim 6, wherein the threshold is a luminance value of white paper.

9. The image processing apparatus according to claim 4, wherein the colorimetric values further include a colorimetric value obtained in a case of performing a color measurement in a diffused-light direction on a side close to an entry direction of the illumination light relative to the front direction.

10. The image processing apparatus according to claim 5, wherein the colorimetric values further include a colorimetric value obtained in a case of performing a color measurement in a diffused-light direction on a side close to an entry direction of the illumination light relative to the front direction.

11. The image processing apparatus according to claim 6, wherein the colorimetric values further include a colorimetric value obtained in a case of performing a color measurement in a diffused-light direction on a side close to an entry direction of the illumination light relative to the front direction.

12. The image processing apparatus according to claim 8, wherein the colorimetric values further include a colorimetric value obtained in a case of performing a color measurement in a diffused-light direction on a side close to an entry direction of the illumination light relative to the front direction.

13. The image processing apparatus according to claim 7, wherein the colorimetric values further include a colorimetric value obtained in a case of performing a color measurement in a diffused-light direction on a side close to an entry direction of the illumination light relative to the front direction.

14. An image processing apparatus comprising:
at least one processor configured to execute:
a first converter that converts amounts of coloring materials including a luster coloring material to colorimetric values obtained by illuminating a target color image with illumination light in a diagonal direction, the target color image having been printed using the coloring materials, the colorimetric values including a colorimetric value obtained by performing a color measurement in a front direction that is a direction normal to the target color image and a colorimetric value obtained by performing a color measurement in a regular reflection direction relative to the illumination light; and
a second converter that converts the colorimetric value in the front direction obtained from conversion by the first converter to display values for displaying the target color image on a display device such that a luminance level of the obtained display values is higher than a luminance level of the colorimetric value in the front direction as a luminance value of the colorimetric value in the regular reflection direction increases,
wherein the image processing apparatus further comprises a memory configured to store a display-device color conversion model in which combinations of color measurement directions and display values of respective colors are associated with colorimetric values actually measured on the display device, and
wherein the second converter determines display values for which a weighted average of color differences between the colorimetric values in the respective color measurement directions obtained from conversion by the first converter and colorimetric values in the respective color measurement directions obtained from the display-device color conversion model is minimized.

15. The image processing apparatus according to claim 14, wherein the luster coloring material is a metallic gloss color toner.

16. An information processing apparatus comprising:
a display device configured to display an image using specified display values;
a first converter that converts amounts of coloring materials including a luster coloring material to colorimetric values obtained by performing, in color measurement directions, a color measurement of a target color image printed using the coloring materials;
a second converter that converts the colorimetric values obtained from conversion by the first converter to display values for displaying the target color image on the display device; and
a display controller that controls the display device to display the target color image using the display values obtained from conversion by the second converter,
wherein the image processing apparatus further comprises a memory configured to store a display-device color conversion model in which combinations of color measurement directions and display values of respective colors are associated with colorimetric values actually measured on the display device, and
wherein the second converter determines display values for which a weighted average of color differences between the colorimetric values in the respective color measurement directions obtained from conversion by the first converter and colorimetric values in the respective color measurement directions obtained from the display-device color conversion model is minimized.

* * * * *